US009122859B1

(12) United States Patent
Djabarov et al.

(10) Patent No.: US 9,122,859 B1
(45) Date of Patent: Sep. 1, 2015

(54) BROWSER BASED EVENT INFORMATION DELIVERY MECHANISM USING APPLICATION RESIDENT ON REMOVABLE STORAGE DEVICE

(75) Inventors: Gueorgui N. Djabarov, Tucson, AZ (US); Yevgeniy Gutnik, Cupertino, CA (US); Omer Shakil, Mountain View, CA (US); Sanjeev Radhakrishnan, San Jose, CA (US); Shrikant S. Kelkar, Sunnyvale, CA (US); Benjamin Lewis, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 928 days.

(21) Appl. No.: 12/650,375

(22) Filed: Dec. 30, 2009

Related U.S. Application Data

(60) Provisional application No. 61/141,655, filed on Dec. 30, 2008.

(51) Int. Cl.
  *G06F 21/34* (2013.01)
  *G06F 21/60* (2013.01)
  *H04L 9/08* (2006.01)
  *H04L 29/06* (2006.01)
  *G06Q 20/34* (2012.01)

(52) U.S. Cl.
  CPC .............. *G06F 21/34* (2013.01); *G06F 21/606* (2013.01); *G06Q 20/341* (2013.01); *H04L 9/0897* (2013.01); *H04L 63/0853* (2013.01)

(58) Field of Classification Search
  None
  See application file for complete search history.

(56) References Cited

U.S. PATENT DOCUMENTS

| 5,617,561 | A   |   | 4/1997  | Blaauw et al. ................ 395/500 |
| 5,963,915 | A   | * | 10/1999 | Kirsch .......................... 705/26.8 |
| 6,018,619 | A   | * | 1/2000  | Allard et al. ................... 709/224 |
| 6,505,201 | B1  | * | 1/2003  | Haitsuka et al. ...................... 1/1 |
| 6,975,656 | B1  |   | 12/2005 | Madhavapeddi et al. |
| 6,975,659 | B2  |   | 12/2005 | Nagano et al. ................... 372/36 |
| 7,146,638 | B2  |   | 12/2006 | Malcolm |
| 7,216,236 | B2  | * | 5/2007  | Kou et al. ...................... 713/183 |
| 7,237,137 | B2  |   | 6/2007  | Goeller et al. |
| 7,418,733 | B2  |   | 8/2008  | Connary et al. |
| 7,480,716 | B2  |   | 1/2009  | Ehrich et al. |
| 7,519,704 | B2  |   | 4/2009  | Ehrich et al. |
| 7,904,652 | B1  |   | 3/2011  | Castelli et al. |
| 7,930,476 | B1  |   | 4/2011  | Castelli et al. |

(Continued)

OTHER PUBLICATIONS

Sygate Personal Firewall Pro User Guide Version 5.5, Sygate, 2003, 16 pages.

*Primary Examiner* — Backhean Tiv
(74) *Attorney, Agent, or Firm* — Morgan, Lewis & Bockius LLP

(57) ABSTRACT

At a client, a first application is executed to identify event information with respect to events that occur at the client, including events associated with execution of one or more other applications resident on the client. The first application communicates with a second application, also executing on the client, to transmit the event information to a communications network, wherein the second application and not the first application is in communication with the communications network. In some embodiments, the second application is a browser application. Optionally, the first application installs a browser loadable object in the browser application, and the browser loadable object registers callback information with the first application. Later, the first application uses the callback information to communicate a network request to the browser loadable object.

13 Claims, 16 Drawing Sheets

(56) References Cited

U.S. PATENT DOCUMENTS

| | | |
|---|---|---|
| 8,056,070 B2 | 11/2011 | Goller et al. |
| 8,082,330 B1 | 12/2011 | Castelli et al. |
| 2002/0010769 A1* | 1/2002 | Kippenhan et al. ............ 709/223 |
| 2002/0078256 A1 | 6/2002 | Gehman et al. ............... 709/318 |
| 2003/0110376 A1* | 6/2003 | Wiener et al. ................. 713/158 |
| 2004/0003290 A1 | 1/2004 | Malcolm |
| 2004/0044912 A1 | 3/2004 | Connary et al. |
| 2004/0128528 A1* | 7/2004 | Poisner ......................... 713/200 |
| 2004/0255053 A1* | 12/2004 | Kang ................................ 710/1 |
| 2005/0028171 A1 | 2/2005 | Kougiouris et al. ........... 719/318 |
| 2005/0094661 A1 | 5/2005 | Seligman et al. .............. 370/449 |
| 2005/0251530 A1 | 11/2005 | Handy-Bosma et al. .. 707/104.1 |
| 2005/0256847 A1* | 11/2005 | Karstens ............................ 707/3 |
| 2005/0278731 A1 | 12/2005 | Cameron et al. ................. 725/14 |
| 2006/0031205 A1 | 2/2006 | Perkins et al. |
| 2006/0031680 A1 | 2/2006 | Maiman ......................... 713/182 |
| 2006/0075228 A1 | 4/2006 | Black et al. .................... 713/167 |
| 2006/0190998 A1* | 8/2006 | Aiello et al. ..................... 726/11 |
| 2007/0005685 A1* | 1/2007 | Chau et al. ..................... 709/203 |
| 2007/0110070 A1 | 5/2007 | Chang et al. ................... 370/394 |
| 2007/0192378 A1* | 8/2007 | Atchison ....................... 707/200 |
| 2007/0207800 A1* | 9/2007 | Daley et al. .................... 455/425 |
| 2007/0244571 A1 | 10/2007 | Wilson et al. .................... 700/11 |
| 2007/0255704 A1 | 11/2007 | Baek et al. ......................... 707/6 |
| 2007/0266079 A1 | 11/2007 | Criddle et al. ................. 709/203 |
| 2007/0300306 A1* | 12/2007 | Hussain .......................... 726/27 |
| 2008/0005264 A1* | 1/2008 | Brunell et al. ................. 709/217 |
| 2008/0022380 A1* | 1/2008 | Lu et al. ............................ 726/9 |
| 2008/0052770 A1* | 2/2008 | Ali et al. ............................ 726/9 |
| 2008/0092638 A1 | 4/2008 | Brenneman et al. .......... 73/61.41 |
| 2008/0133739 A1* | 6/2008 | Zuzga et al. ................... 709/224 |
| 2008/0167860 A1 | 7/2008 | Goller et al. |
| 2008/0242306 A1* | 10/2008 | Fletcher et al. ................ 455/445 |
| 2009/0077136 A1* | 3/2009 | Igawa et al. .................... 707/200 |
| 2009/0094383 A1* | 4/2009 | Hinton et al. .................. 709/250 |
| 2009/0125544 A1* | 5/2009 | Brindley ......................... 707/102 |
| 2009/0216520 A1* | 8/2009 | Khan et al. ....................... 703/26 |
| 2009/0319789 A1* | 12/2009 | Wilson et al. .................. 713/168 |

* cited by examiner

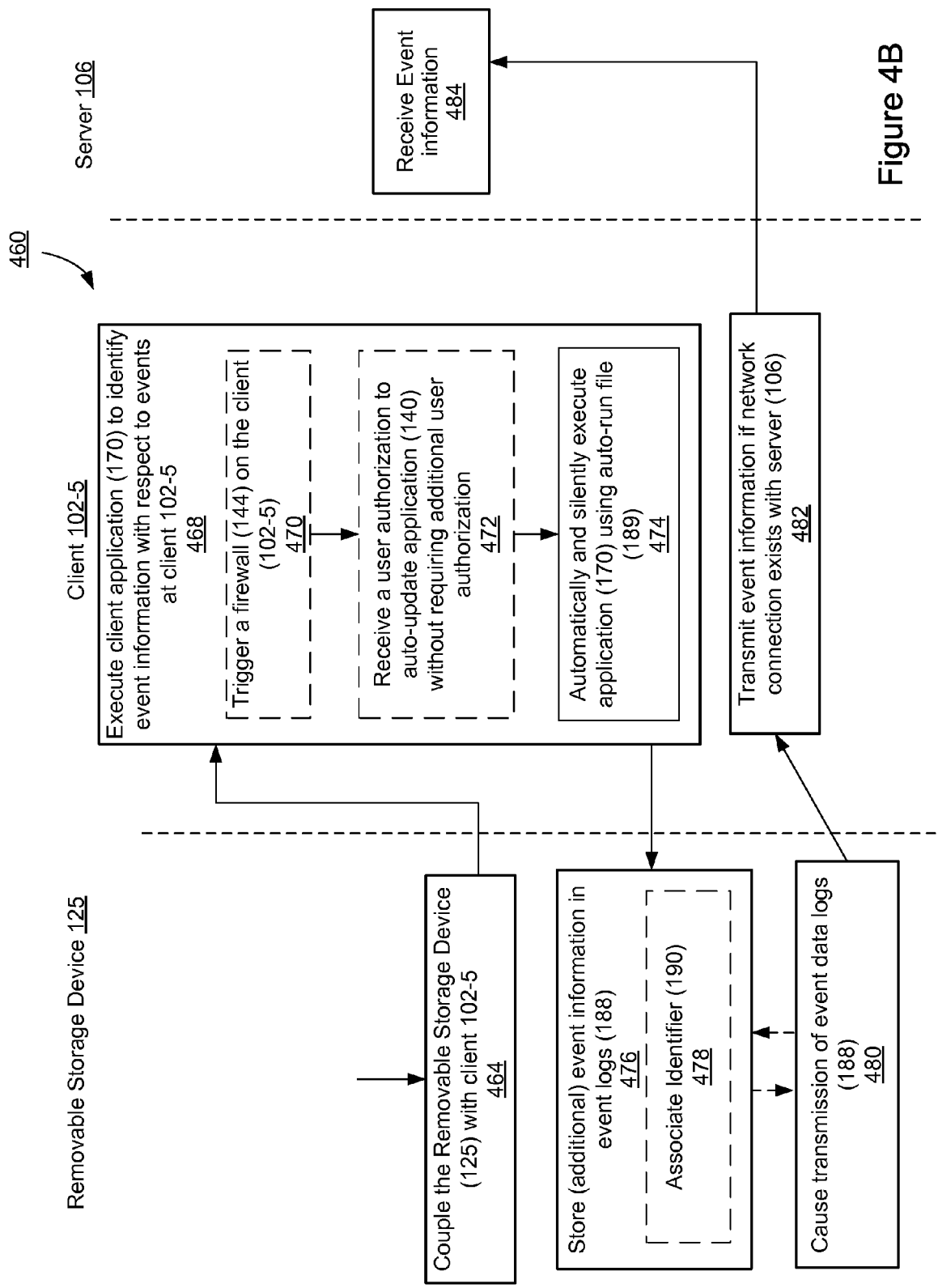

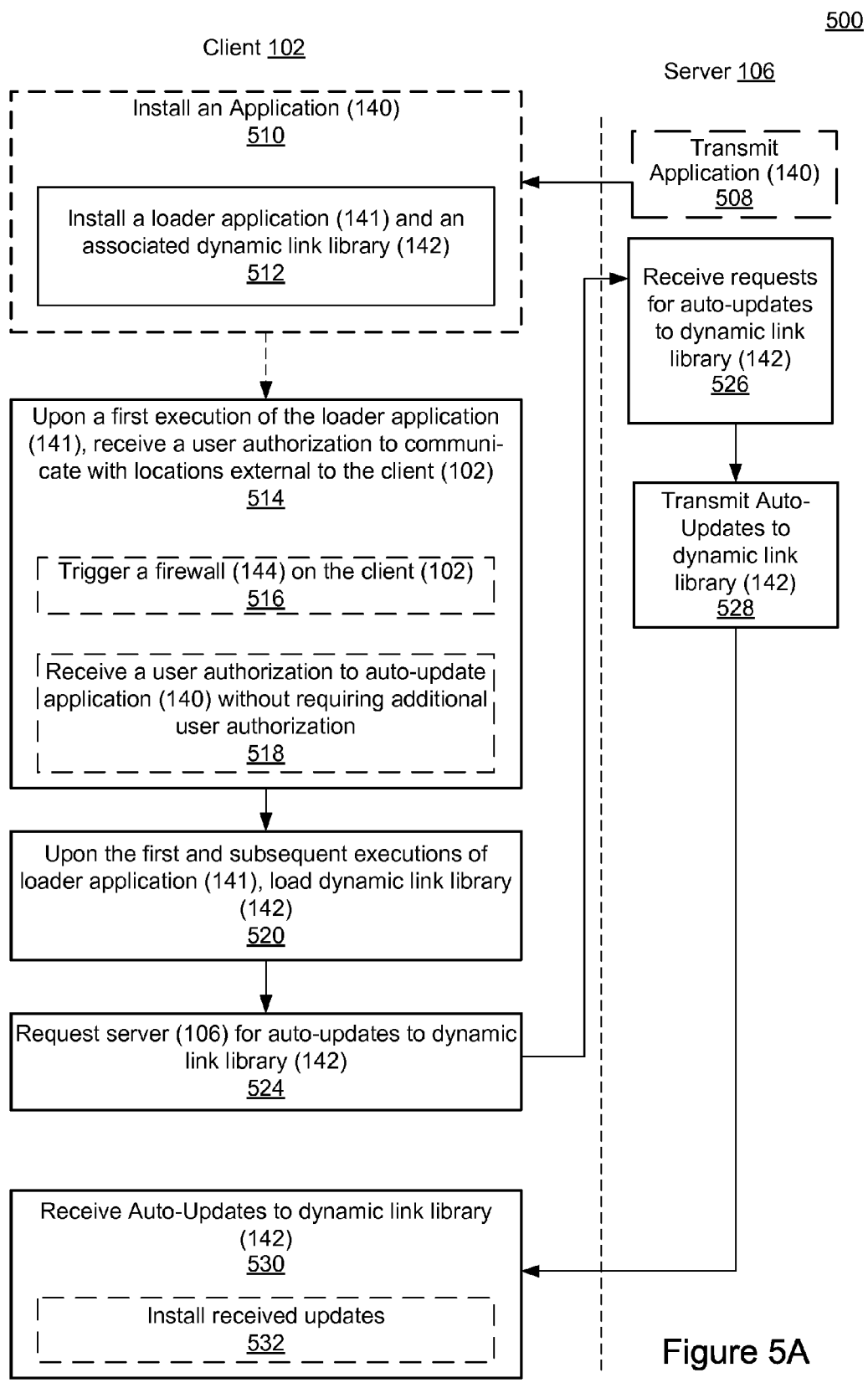

BROWSER BASED EVENT INFORMATION DELIVERY MECHANISM USING APPLICATION RESIDENT ON REMOVABLE STORAGE DEVICE

RELATED APPLICATIONS

This application claims priority under 35 U.S.C. 119 to U.S. provisional application 61/141,655, "Recording Client Events Using Application Resident on Removable Storage Device," filed Dec. 30, 2008, which is hereby incorporated by reference in its entirety.

This application is related to U.S. patent application Ser. No. 12/650,379, "Recording Client Events Using Application Resident on Removable Storage Device," filed on Dec. 30, 2009, which is hereby incorporated by reference in its entirety.

This application is related to U.S. patent application Ser. No. 12/650,388, "Auto-Run and Auto-Update of Application Stored on Removable Storage Device," filed on Dec. 30, 2009, which is hereby incorporated by reference in its entirety.

TECHNICAL FIELD

The disclosed embodiments relate generally to collecting data event information concerning events that occur at client computers or devices.

BACKGROUND

It is difficult to receive event data from different clients being used by the same one user during different time periods in such a way that the event data received from the different clients is automatically associated with the same one user, without requiring installation of special software on each of the different clients.

SUMMARY

At a client, a first application is executed to identify event information with respect to events that occur at the client, including events associated with execution of one or more other applications resident on the client. The first application communicates with a second application, also executing on the client, to transmit the event information to a communications network, wherein the second application and not the first application is in communication with the communications network.

In some embodiments, the second application is a browser application. Optionally, the first application installs a browser loadable object in the browser application, and the browser loadable object registers callback information with the first application. Later, the first application uses the callback information to communicate a network request to the browser loadable object.

In some embodiments, the first application is resident on and executed from a removable memory device coupled with the client. Optionally, the removable memory device has a secure partition and a non-secure partition, wherein the first application is stored on and executed by the client from a secure partition of the removable memory device. Optionally, the identified event information is stored at least temporarily on the non-secure partition of the removable memory device before transmission of the identified event information to a server via the communications network.

BRIEF DESCRIPTION OF THE DRAWINGS

The aforementioned features and advantages as well as additional features and advantages will be more clearly understood with reference to the detailed description below in conjunction with the drawings.

FIGS. 4A-4B are flow diagrams of a process for recording events using an application resident on a removable storage device according to some embodiments.

FIG. 5A is a flow diagram of a process for auto-updating an application without requiring repeated user authorization according to some embodiments.

Like reference numerals refer to corresponding parts and operations throughout drawings.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, and components have not been described in detail so as not to unnecessarily obscure aspects of the embodiments.

Figure 1:
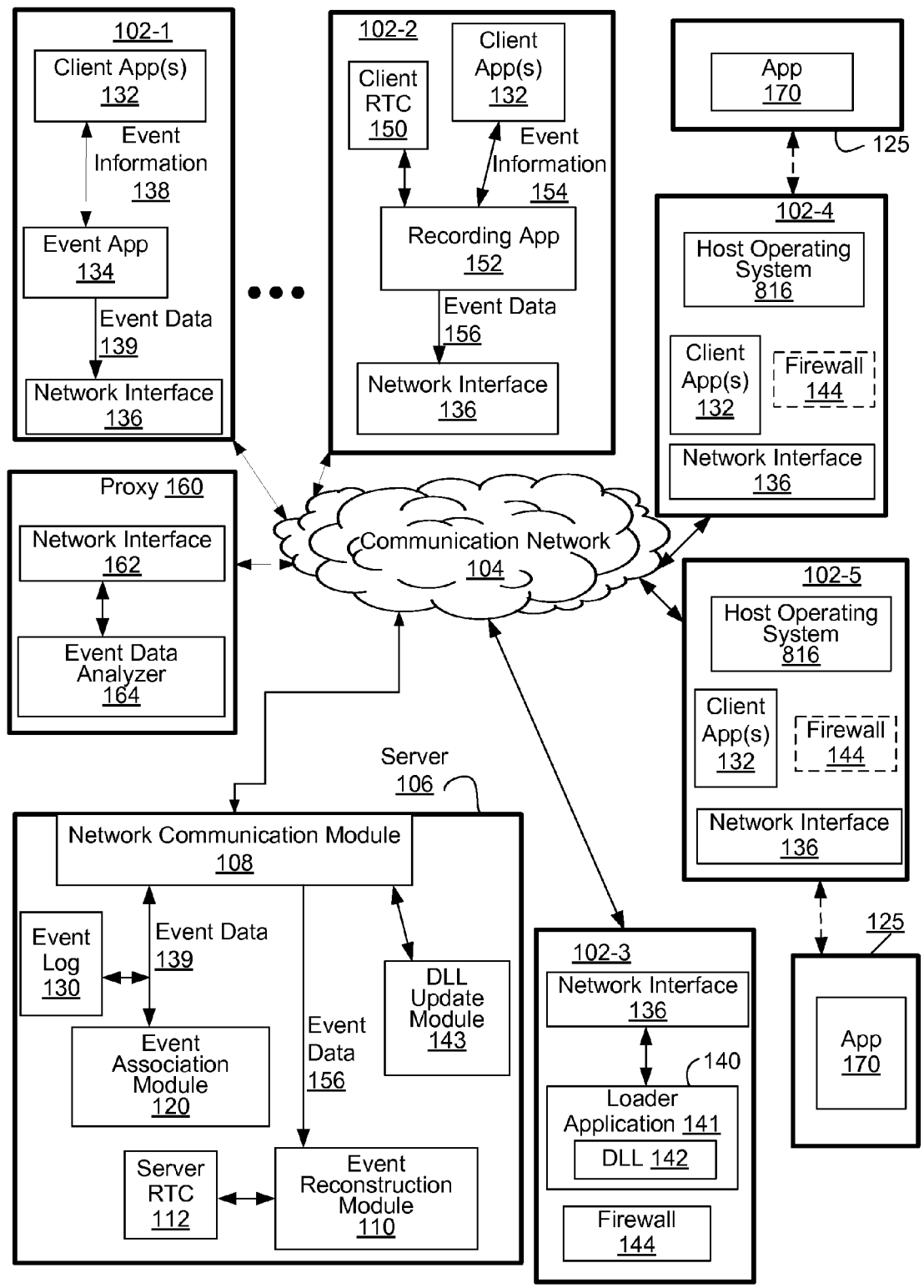
FIG. 1 is a diagram of an environment in which embodiments of the present invention may be practiced.

FIG. 1 is a diagram of a distributed computer system 100 (also called an environment) in which embodiments of the present invention may be practiced. One or more clients 102 (also called client computers or client devices, but hereinafter "clients," such as clients 102-1, 102-2, 102-3, 102-4 and 102-5) are in communication with communication network 104. A server 106 (also known as a server system, since it include multiple servers) and a proxy 160 (also known as a "proxy server" or "proxy system") are also in communication with communication network 104.

Communication network 104 can be any wired or wireless local area network (LAN) and/or wide area network (WAN), such as an intranet, an extranet, the Internet or any suitable combination thereof. It is sufficient that communication network 104 provides communication capability between clients 102, proxy 160 and server 106. In some embodiments, Hyper-Text Transport Protocol (HTTP) and the Transmission Control Protocol/Internet Protocol (TCP/IP) are used to transport requests, replies, messages, data and other communications across communication network 104. The various embodiments, however, are not limited to the use of any particular protocol.

A client 102 connected to communication network 104 may be identified by an IP address. As used herein, "IP address" includes an identifier and locator of a client within the communication network, and is not limited to the use of any particular protocol. Client 102 can be any of a number of devices (e.g., a computer, an internet kiosk, a personal digital assistant, a cell phone, a gaming device, a desktop computer, or a laptop computer). Client 102 can include one or more client applications 132 and a host operating system 816. Clients 102 can further include a client application 140 (see client 102-3), and/or an event application 134 (see client 102-1), and/or a recording application 152 (see client 102-2). Although client applications 132 and 140, an event application 134, and recording application 152 are shown in FIG. 1 as existing on three different clients (102-1, 102-2 and 102-3), in some embodiments two or more of the client application 140, event application 134 and recording application 152 may coexist on the same client. Alternately, a system may include one of the clients 102-1, 102-2, 102-3 and a corresponding subset of the aforementioned applications, without the others. Client 102 includes a network interface 136 to communicate with communication network 104. Client 102 is described further in reference to FIG. 8.

In some embodiments, a client application 132 can be an application that permits a user to interact with the client and/or network resources to perform one or more tasks. For example, a client application 132 can be a web browser (e.g., any of the computer applications known as Internet Explorer® (a trademark of Microsoft Corporation), Mozilla Firefox® a trademark of Mozilla Corporation), or Google Chrome (a trademark of Google Inc.) or other type of application (e.g., an email client, a document editor, etc.) that permits a user to search for, browse, and/or use resources, such as Web pages or other documents or sets of information. Client application(s) 132, when executed by client 102, perform operations comprising local events at the client. Examples of local events may include a user accessing a URL, a user activating a client application 132, a user accessing a client application 132, a user performing operations within an accessed URL or client application 132, an HTTP request originating from the client, and so on.

Event application 134 identifies event information 138 with respect to at least some of the local events at client 102, removes personal identifiable information (PII) from the event information 138 to produce event data 139, and transmits the event data to server 106 using network interface 136. In some embodiments, at least some of event data 139 is transmitted to server 106 via proxy 160, which includes network interface 162 to communicate with communication network 104 and event data analyzer 164 to further process received event data before transmission to server 106. Event application 134 is discussed further in reference to FIGS. 2A and 2B. Proxy 160 is discussed further in reference to FIG. 2A and FIG. 10.

Recording application 152 records event information 154 with respect to events occurring at client 102-2, including events generated by one or more applications 132. Recording application 152 also records a current client real time clock (RTC) 150 time at the occurrence of each event and assigns a unique sequence identifier to each event so as to generate event data 156. Thus, the event data 156 for a respective event includes event information 154 from an application, a time value and a unique sequence identifier. Recording application 152 transmits the event data 156 to server 106 using network interface 136. Recording application 152 is described further in reference to FIGS. 6A and 6B. In some embodiments, recording application 152 comprises at least a subset of event application 134.

Client application 140 is a single application that includes a loader application 141 and an associated dynamic link library DLL 142. In some embodiments, client application 140 is one of: an event application 134, a recording application 152, a combination of event application 134 and recording application 152, a subset of a combination of event application 134 and recording application 152, a subset of event application 134, and a subset of recording application 152. Loader application 141 is installed on the client system 102. When loader application 141 is executed for a first time it receives a user authorization, such as one required when a firewall 144 on the client 102-3 is triggered, to communicate with locations external to the client 102-3. At least portions of the dynamic link library 142 are auto-updated during one or more executions of the loader application 141 without requiring additional user authorization. The loader application 141 may be never or infrequently auto-updated. Client application 140 is described further in reference to FIG. 5A.

In some embodiments, a removable storage device 125 is removably coupled with or otherwise in communication with client 102. For example, removable storage device 125 is coupled with client 102-4 during one or more first time periods and is coupled with another client 102-5 during one or more second time periods that are non-overlapping with the first time periods. Removable storage device 125 can be any one of many available storage devices that can be used by a user for storing data. In some embodiments, the removable storage device 125 has both a secure partition and a non-secure partition. For example, the removable storage device 125 can be a USB drive (e.g., a USB flash memory drive, sometimes called a thumb drive) having a secure partition and a non-secure partition. One particular implementation of such a USB drive is a USB smart drive. A USB smart drive is typically a USB memory device that presents itself to the host computer (e.g., client 102, as two storage devices, such as a USB memory device (comprising the non-secure partition of the device) and a CD/DVD device (comprising the secure partition of the device). Removable storage device 125 is described further in reference to FIG. 3.

A client application 170 is stored on the removable storage device 125, and can be a subset of recording application 152 and event application 134. Alternately, client application 170 can be a combination of recording application 152 and event application 134. When the removable storage device 125 is in communication with a given client (e.g., 102-4 or 102-5), client application 170 (resident on the removable storage device 125) records event information with respect to events occurring at the given client, including events generated by one or more client applications 132 resident on the particular client. Client application 170 causes transmission of the event information to server 106 using network interface 136. Client application 170 is described further in reference to FIGS. 3, 4A, 4B, 5B and 5C.

In some embodiments, server 106 includes a network communication module 108, an event reconstruction module 110, a server real-time clock (RTC) 112, one or more event logs 130, a DLL update module 143 and an event association module 120. The server 106 may include additional modules and/or sub-modules, or fewer modules and/or sub-modules than indicated in FIG. 1. For example, the event log(s) 130 may be integrated with the event association module 120. Further, various modules and sub-modules of server 106 may be distributed on one or more other servers. An embodiment of a server 106 is described further in reference to FIG. 9.

In some embodiments, network communication module 108 may be configured to handle requests from a client 102 and return resources, responses, and other information to the client 102 via communication network 104. For instance, network communication module 108 handles a request from a client (such as, client 102-3 or client 102-4) for an update (e.g., an update to dynamic link library 142). The DLL update request is sent by network communication module 108 to a location external to the client 102, which provides an auto-update to the requesting client. In the embodiments described here, the request is sent to DLL update module 143 in server 106, which provides an auto-update to the requesting client. DLL update module 143 is discussed further in reference to FIGS. 5A-C and FIG. 9.

In some embodiments, network communication module 108 in server 106 receives event data 139 associated with events that occur at client 102-1. Event data 139 may be received from one or both of a client 102-1 and a proxy 160. Event data 139 is data from which at least some personal identifiable information (PII) has been removed. Network communication module 108 in server 106 may also receive event data from clients 102-4 and 102-5. In some embodiments, received event data, such as event data 139, is stored in an event log 130 in server 106.

Optionally, event association module 120 further processes the received event data to find correlations and patterns among the events that occur at the same clients, and to generate statistics and perform statistical analyses. In some embodiments, event association module 120 finds correlations and patterns even though event data (such as, event data 139) has had at least some personal identifiable information (PII) removed from it. To find such correlations and patterns, event association module 120, when generating statistics from the received event data, takes into account event data known to come from the same client, even though the received data does not contain PII. For instance, the event association module 120 analyzes the received event data for each client to identify particular event sequences and patterns, and then uses that information to generate statistics (e.g., frequency of occurrence across many clients, correlation with other events, etc.) concerning those particular event sequences and patterns.

In some embodiments, network communication module 108 receives event data 156 from client 102-2. Event data 156 includes: event information with respect to events that occur at client 102-2, the client real time clock (RTC) 150 time associated with each event and unique sequence identification information associated with each event. Network communication module 108 passes received event data 156 to event reconstruction module 110, which reconstructs at least one of: a chronological order of the events on the client 102-2 and the time when each event occurred at the client 102-2, based, for instance, on the server RTC 112. Event reconstruction module 110 is discussed further in reference to FIGS. 6A, 6B and 9.

Also shown in FIG. 1 is a proxy 160, which in some embodiments receives event data 139 from client 102-1 and further processes event data 139 using an event data analyzer 164 before transmitting it to server 106 via network interface 162 and communication network 104.

It should be appreciated that the layout of the server 106 and proxy 160 in FIG. 1 is merely by way of example and may take on any other suitable layout or configuration. The actual number of computers constituting the server 106 and proxy 160 and the allocation of features among the computers may vary from one implementation to another, and may depend in part on the amount of traffic that the server 106 handles during peak usage periods as well as during average usage periods. Moreover, one or more of the server modules or components in FIG. 1 may be implemented on one or more servers designed to provide the described functionality. For example, the DLL update module 143 and the event log 130 may be implemented on different servers in some embodiments.

As used herein, the terms "module, "procedure," and "application" correspond to computer program instructions stored in a computer readable storage medium for execution by one or more processors, for performing one or more functions. These instructions need not be implemented as separate software programs, procedures or modules. The various modules and sub-modules may be rearranged, separated, and/or combined. The distributed system 100 may include additional modules and/or sub-modules, or fewer modules and/or sub-modules than indicated in FIG. 1. The modules shown in FIG. 1 as being part of distributed system 100 represent functions performed in an embodiment. Although FIG. 1 portrays discrete blocks, the figure is intended more as a functional description of some embodiments of the invention rather than a structural description of the functional elements. One of ordinary skill in the art will recognize that an implementation might group or split the functional elements among various components.

Figure 2A:
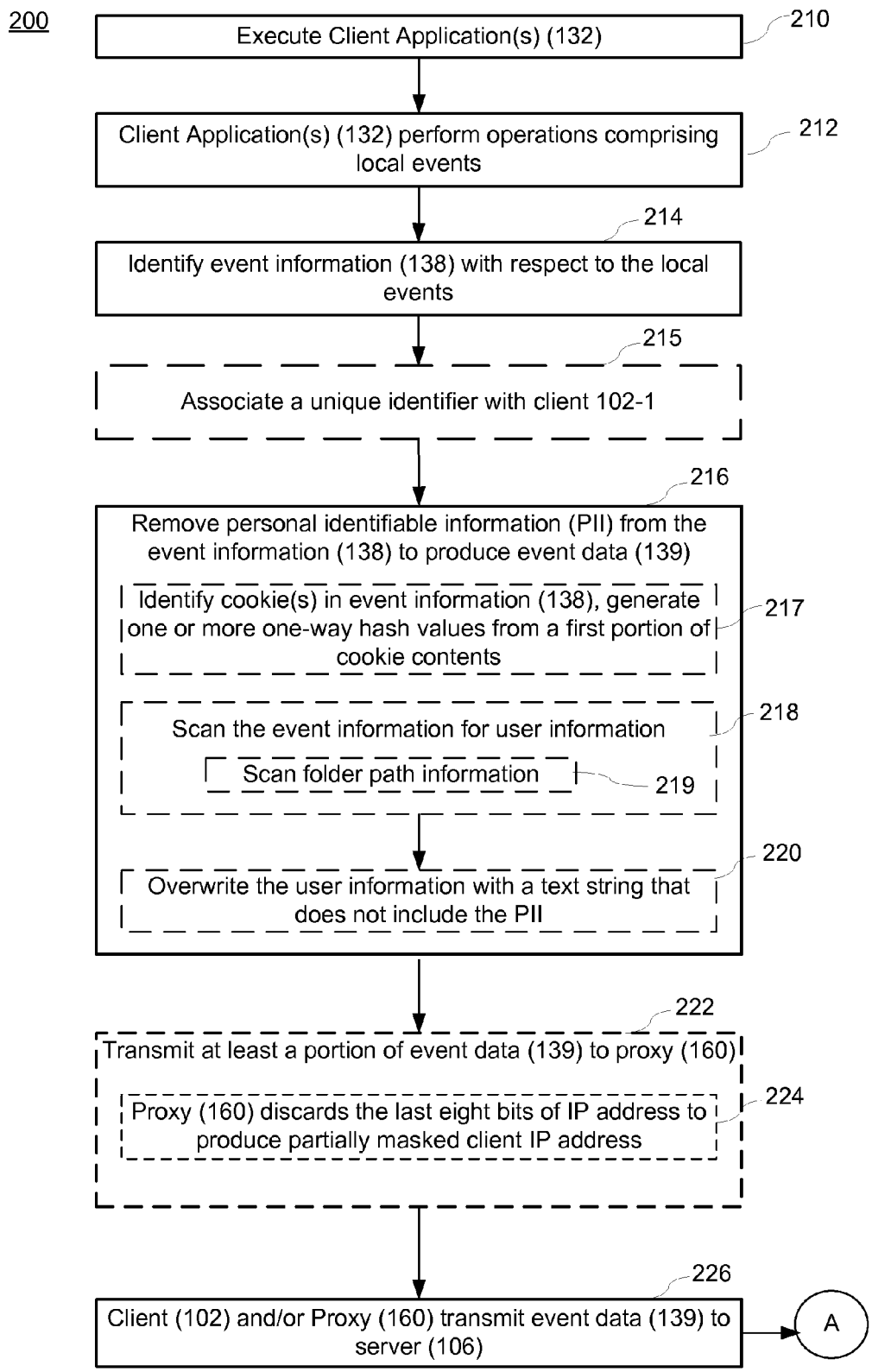
FIGS. 2A-2B are flow diagrams of a process for removing personal identifiable information from client event information according to some embodiments.
Figure 2B:
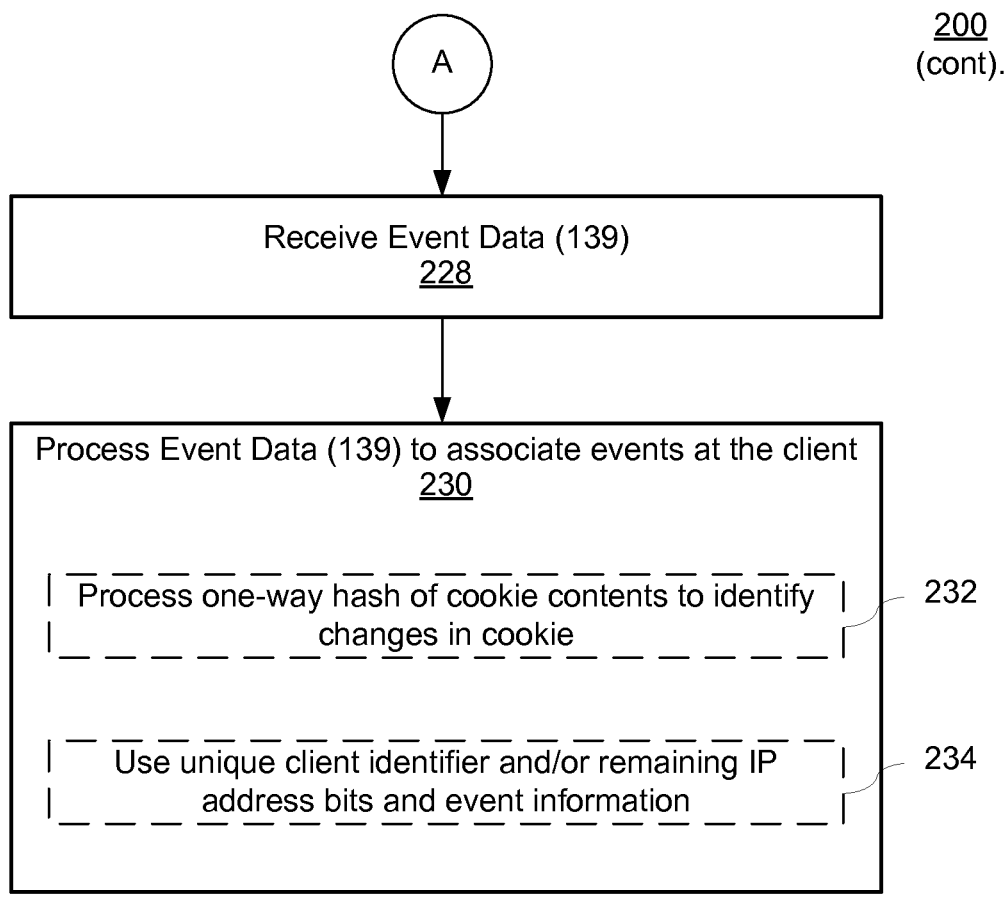

FIGS. 2A and 2B are flow diagrams of a process 200 for removing personal identifiable information from client event information according to some embodiments. FIGS. 2A and 2B illustrate both client-side and server-side operations involved in process 200. In some embodiments, at least some of the client-side operations are performed by event application 134 (FIG. 1). Optional operations are indicated by dashed lines (e.g., boxes with dashed-line borders).

In some embodiments, a user at client 102-1 executes one or more client applications 132 (210). As discussed, examples of client applications 132 include web browser applications, email client applications and so on.

Client application(s) 132, when executed by client 102-1, perform operations comprising local events at client 102-1 (212). Examples of local events may include a accessing a URL (e.g., in response to user activation of a link to the URL), starting execution of a client application 132, performing operations within an accessed URL or client application 132, and so on.

Event application 134 identifies event information 138 with respect to the local events at client 102-1 (214). For instance, event application 134 identifies that the user (i.e., the user of client 102-1) has accessed a certain URL or closed a client application 132, or accessed (e.g., clicked on or otherwise activated) a link on a Web page, and so on.

Optionally, event application 134 associates a unique identifier with client 102-1 (215). In some embodiments, the unique identifier is randomly or pseudo-randomly generated by client 102-1 when the event application 134 or client application 140 is first executed after installation on client 102-1. The unique identifier for the client is durably stored on the client 102-1 (e.g., in non-volatile memory) or in a device (e.g., a portable device 125 having non-volatile memory) that is associated with the user. In one embodiment, event application 134 transmits the unique identifier with the event data to the server 106, either directly or via proxy 160 (226). In this embodiment, the unique identifier in the event data 139 can be associated by the server with a particular client, without the server knowing the identity of the client or where the client is located. In other words, all event data having the same unique identifier is known by the server 106 to have come from the same client 102-1, even though the server 106 does not know the identity of the client, does not know where the client is located, and does not know the specific identity of the user of the client. It is noted that the unique identifier is typically associated with a single, unique user, even though the server 106 does not know the identity of the user. The same unique identifier continues to be associated with the same user when the user performs operations on (i.e., "uses") other client computers or devices.

Event application 134 removes personal identifiable information (PII) from the event information 138 to produce event data 139 (216). In some embodiments, personal identifiable information includes user information, such as a user name, a user account identifier, and other user account identification information. User information can contain personal information like names and other related information. In some embodiments, event application 134 scans event information 138 to identify user information (218). For instance, event application 134 scans folder path information to identify user information (219), for example by text matching or searching name-value pairs or searching by field name. Further, in some embodiments, event application 134 removes personal identifiable information (PII) from the event information 138 by overwriting identified user information with a text string that does not include PII (220). For some events, PII may be simply deleted from the event information, while for other events the PII may be replaced with non-personal values (e.g., a fixed text string or other fixed value).

In some embodiments, for further processing of event information to further remove PII, event application 134 uses network interface 136 to transmit event data 139 to proxy 160 (222). Proxy 160 receives event data 139 via network interface 162 and uses event data analyzer 164 to identify the client IP address in (or sent along with) event data 139 and to partially redact (e.g., partially mask or remove portions of) the client IP address (224) prior to forwarding the event data, including the partially redacted client IP address, to the server (226). The client IP address is partially redacted (by the proxy 160) by discarding the N least significant bits (e.g., the last eight bits) of the client IP address (224) that is transmitted by the client 102-1 in (or along with) the transmitted event data 139. As discussed, client 102-1 is typically associated with an IP address. The IP address may be a static, globally unique IP address that always identifies the particular client 102-1, a dynamically assigned IP address, or an IP address associated with multiple clients, such as the IP address of a proxy server. For the purposes of this document, it is equally accurate to say that the client includes IP address information "in the event data 139" that it transmits to proxy 160, or to say that such IP address information is sent (by the client) along with the transmitted event data 139.

Because IP addresses act as locators for network-connected devices, the proxy discards the last eight bits (or more generally the N least significant bits, where N is an integer greater than three) of the client IP address to produce a partially redacted client IP address that is sent along with the event data to the server. Discarding one bit (N=1) would mean that the partially redacted IP address is associated with one of two clients. Discarding five bits (N=5) would mean that the partially redacted IP address is associated with one of thirty-two ($=2^5$) clients or machines. Discarding eight bits (N=8) would mean that the partially redacted IP address is associated with one of 256 ($=2^8$) machines. Thus, in some embodiments, the last eight bits of the IP address are discarded, because with 256 potential client machines, it is much more difficult to correlate the event data to the real machine. More generally, discarding the N least significant bits of the client IP address prevents the server 106 (or any other device receiving the event data from the proxy 160) from using the IP address information received from the proxy 160 to determine the precise location or identity of the client that sent the event data 139. In this manner, server 106 receives event data 139 with a partially redacted client IP address. Some of the IP address bits of the client IP address remain intact (e.g., the first 24 bits of a 32 bit IP address), but this information is insufficient to enable the server 106 to determine the identity of the client or where specifically the client is located. On the other hand, retaining a portion of the most significant bits of the IP address of the client that transmits event data can be useful for identifying differences in application usage patterns and other differences in client or user behavior among groups of users from various regions of the world.

Event data 139 is transmitted from client 102-1 and/or proxy 160 to server 106 (226).

Additionally, or in the alternative, event application module 134 identifies one or more cookies in the event information 138 and generates one or more one-way hash values from the cookie(s), or portions of the cookies, to produce respective hash values, and transmits the hash value(s) to the server 106, either directly or via proxy 160 (217). Depending on the context, the hash values may also be called hashed cookie values or cookie hash values. Each of the hash values corresponds to an entire cookie, a predefined field of a cookie (e.g., a user identifier field), or a predefined portion of a cookie (e.g., all of a cookie, excluding one or more predefined fields). The hash value of a cookie, a cookie field, or a cookie portion, changes whenever the cookie, cookie field or cookie portion changes in value.

Generally, cookies are not considered to be personally identifiable information, but they can nevertheless contain sensitive information. For instance, a cookie may contain a user identifier, a creation time, a last modified time, and a signature, all or some of which may be PII, or which may be used indirectly to acquire PII. In one embodiment, a cookie in the event information includes a first portion and a second portion, which are distinct and non-overlapping. The first portion includes a plurality of fields that contain either PII or information that may be considered sensitive, while the second portion of the cookie does not contain PII or sensitive information. At block 217, event application 134 generates one or more hash values based on the cookie contents (or a subset of the cookie contents) in the first portion of the cookie. For instance, event application 134 may generate and record a one-way hash value of the user identifier field of a cookie, a one-way hash value of the creation time of the cookie and a one-way hash value of the last modified time of the cookie. These one-way hash values from the cookie, along with the second portion of the cookie are included in the event data, which is transmitted to the server. One or more fields in the first portion of the cookie, such as a signature field, may be left out of the event data that is transmitted to the server.

Further, in some embodiments, event application 134 combines a unique client identifier with one or more cookie fields when producing the hash values. As discussed above with reference to operation 215, the unique client identifier may be a randomly generated client identifier that is generated at the client by the event application when the event application is first installed or when the event application is executed for a first time. The unique client identifier is generated by the client and fixed in value (i.e., remains unchanged) so as to enable the server to detect usage patterns and generate meaningful statistics concerning application events without using PII and thus without being able to trace any of the event data back to specific individuals.

For instance, in one embodiment the event application 134 combines (e.g., concatenates, or mathematically adds or subtracts) the unique client identifier, UID, to each the fields, or sets of fields, for which a hash value is generated. For example, if a cookie contains, in its first portion, the fields ID=87c0259ed4614876, TM=1155861835, and LM=1157564945, where the ID is a user identifier or event type identifier, TM is a cookie creation time, and LM is a cookie last modified time, two hash values produced by the event application 134 for this cookie are:
HashValue1=hash(87c0259ed4614876+{UID}),
HashValue2=hash(TM=1155861835:LM=1157564945+{UID}),
where "hash( )" represents a predefined one-way hash function, and the + operator is used to combine (e.g., concatenate) the values before and after the + operator. The two hash values in this example remain constant each time they are recomputed for the "same cookie" (e.g., the cookie for a particular URL) so long as the underlying fields remain constant in value. Similarly, the hash values change in value when any of the underlying fields change in value. Furthermore, by combining the field values with the locally generated client identifier, the server cannot correlate cookie values in the event data from different clients.

In some embodiments, instead of being resident on client 102-1, event application 134 or a subset thereof is resident on a removable storage device 125 as client application 170. Client application 170 is discussed with reference to FIGS. 5B and 5C, and removable storage device 125 is discussed with reference to FIG. 3.

FIG. 2B illustrates server-side operations of process 200. Server 106 receives event data 139 from client 102-1 and/or proxy 160 (228). Network communication module 108 receives the event data 139 and passes it to event association module 120.

Event association module 120 processes event data 139 received from multiple clients and associates events received from the same client even though event data 139 has had personal identifiable information (PII) removed from it (230). As described above, the received event data 139 does not include user identifiers, because user identifiers are removed from event information 138 by the client (e.g., by the event application 134) prior to transmitting the event data 139. Further, the received event data 139 does not include the last eight bits (or more generally the N least significant bits where N is an integer greater than three) of the client's IP address, because the least significant bits of the client IP address are removed by a proxy 160 before the event data is forwarded by the proxy to the server 106. The received event data 139 may, however, include a unique client identifier. Because PII has been removed from the event data, the unique client identifier is randomly generated at the client, and the client IP address has been partially masked, the server 106 is unable to use the event data, the partially redacted client IP address and the unique client identifier to identify the client or even the specific location of the client from the received event data.

In some embodiments, event association module 120 processes the received event information 138 and/or the unique client identifier and/or the remaining IP address bits to determine which events are associated with which client, without using sensitive PII (234). Additionally, in some embodiments, event association module 120 may deduce other information from the received event data 139 (which includes events data for multiple events from multiple clients), such as demographic information, user preferences, application usage patterns, online usage patterns, and so on.

In some embodiments, if received event data 139 includes one or more hash values of cookie contents, event association module 120 processes the received event data to identify changes in the cookie based on changes in the hash value(s) (232). In some embodiments, event association module 120 stores the received hash values (hashed cookie values), and uses the stored hash value to compare with earlier or later received hash values from the same client (i.e., with the same unique client identifier) to determine if the cookie has changed.

As illustrated in FIGS. 2A and 2B, process 200 removes both direct personal identifiable information (PII) from user data, such as user information, as well as indirect personal identifiable information (PII), such as that may be gleamed from cookie information and IP address information. Process 200 may be used to remove other types of direct or indirect personal identifiable information (PII) from user data in a similar manner.

Figure 3:
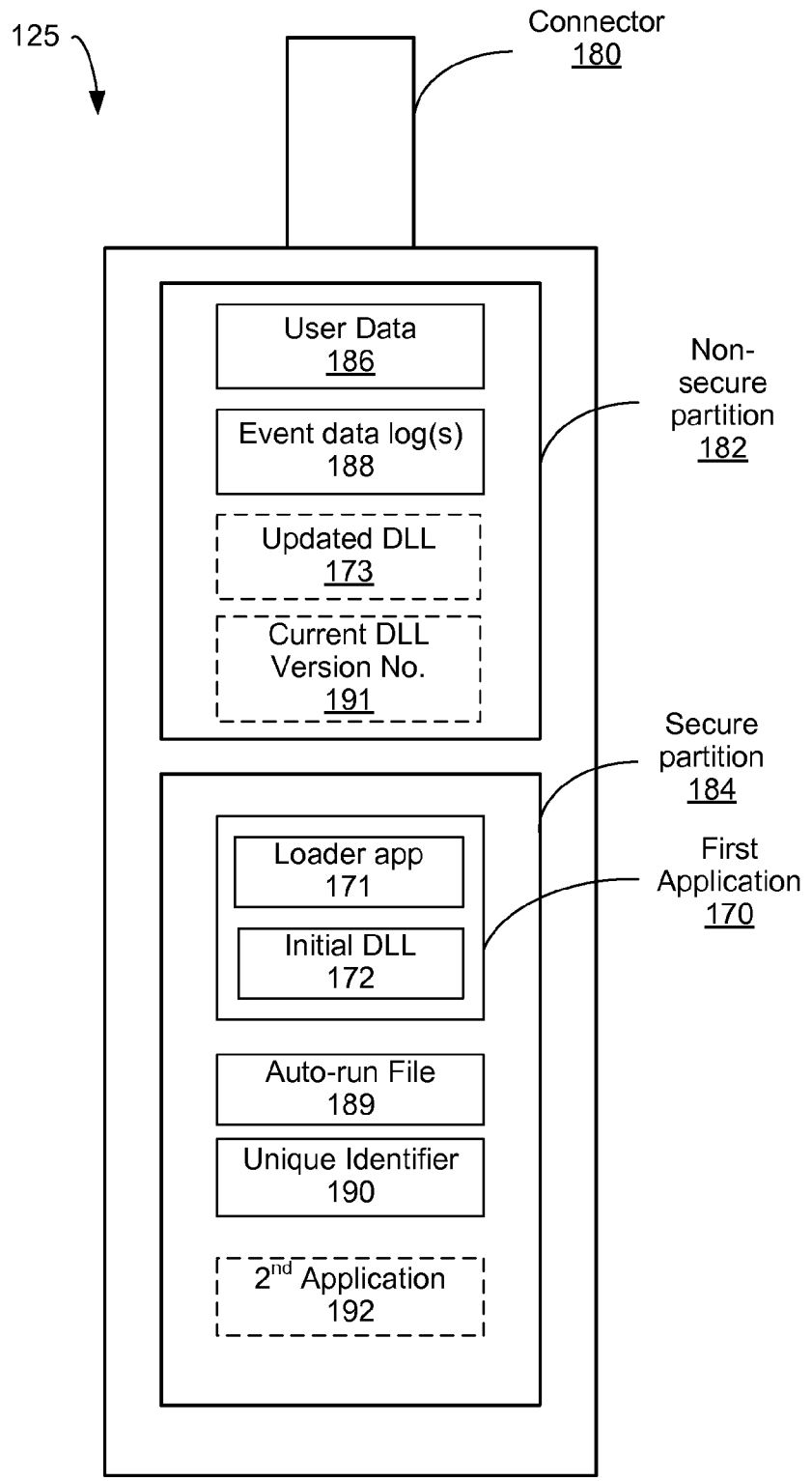
FIG. 3 is a block diagram of a removable storage device according to some embodiments.

FIG. 3 is an embodiment of a removable storage device 125. In some embodiments, removable storage device 125 is a storage device that can connect with or otherwise couple with a client, such as client 102-4, e.g., using a connector 180 (e.g., a standard USB connector). The connection between removable storage device 125 and the client may be a physical connection, such as one obtained by inserting connector 180 into a receptacle at the client. In other embodiments, the connection between removable storage device 125 and the client may be established wirelessly, such as using BlueTooth®, infrared technology, etc. In some embodiments, removable storage device 125 is a USB drive that connects to a USB port on the client, such as client 102-4, e.g., using a connector 180 that is a standard USB connector (e.g., a USB connector meeting the physical and electrical requirements of the applicable USB standard, such as USB Specification Version 1.1 or USB Specification Version 2.0). In some embodiments, removable storage device 125 is a USB flash drive. In some embodiments, removable storage device 125 is a U3 smart drive that adheres to the U3 specification. Alternatively, removable storage device 125 is a hard disk drive device or other storage device having any suitable connector for coupling the device 125 to the client 102-4.

FIG. 3 shows an embodiment of removable storage device 125 that has a secure partition 184 and a non-secure partition 182. In some embodiments, contents of secure partition 184 cannot be easily erased or amended and in some other embodiments may not be erasable and/or replaceable at all, while contents of non-secure partition 182 may be written over, replaced, deleted and/or amended, using normal non-privileged file access procedures, by a user of the removable storage device 125 and/or by an application accessing the contents of non-secure partition 182. In some embodiments, information in the secure partition 184 of a respective removable storage device 125 may be erased or changed only by executing a privileged procedure that is not normally installed on or available to a respective client.

Stored in the secure partition 184 is application 170, sometimes called the first application to distinguish it from any other applications stored on the removable storage device. The application 170 includes a loader application 171 and an initial version of a dynamic link library (DLL) 172 associated with application 170. Application 170 is discussed further in reference to FIG. 4. Further stored in the secure partition 184 is an auto-run program 189 (sometimes called an auto-run function) that is executed by a host operating system 816 (FIG. 8) of a client to which the removable storage device 125 is coupled, such as client 102-4 (FIG. 1), so as to automatically execute application 170, as described further in reference to FIGS. 4A, 4B, 5B and 5C. The auto-run function 189 is automatically executed by the client 102-4 when the removable storage device 125 is coupled to the client 102-4.

Also stored in the secure partition 184 may be a unique identifier 190 that uniquely identifies the removable storage device 125. In some embodiments, unique identifier 190 may be generated and assigned to the removable storage device 125 when the removable storage device 125 is manufactured. In other embodiments, unique identifier 190 may be assigned at a time later than when the removable storage device 125 is manufactured. For instance, in some embodiments, unique identifier 190 may be assigned to the removable storage device 125 at a time when the application 170 is stored on the secure partition 184. In some embodiments, the unique identifier 190 or some derivative thereof is included in communications with server 106, thereby identifying that the communications pertain to the particular removable storage device 125 and/or a particular user associated with the particular removable storage device 125 and/or the instance of the application 170 stored on the particular removable storage device 125. When the removable storage device 125 is associated with a particular individual user, the unique identifier 190 may be called a unique user identifier 190.

A user of the removable storage device 125 may store user data 186 on non-secure partition 182, and may write over, replace, delete and/or otherwise change contents of user data 186. Further stored in the non-secure partition 182 are one or more event data logs 188. Event data logs 188 contain event data with respect to events occurring at a client with which the removable storage device 125 is coupled, such as client 102-4, as recorded by application 170. Stated another way, event data is stored at least temporarily in the event data logs 188, on the non-secure partition 182 of the removable memory device, before the event data is transmitted to the server 106. Event data logs 188 are discussed further in reference to FIG. 4B. Further stored in the non-secure partition 182 may be an updated version of a dynamic link library (DLL) 173 associated with application 170. The updated version of DLL 173 is discussed further in reference to FIGS. 5B and 5C. Optionally, a DLL version number 191, identifying the current version of the updated DLL 173, may also be stored in the non-secure partition 182 of the removable storage device 125.

Optionally, the removable storage device 125 stores a second application 192 in either the secure partition 184 or the non-secure partition 182 of the device. Typically, the second application 192 is a client application for providing services to a user of a respective client. For example, but without limitation, the second application can be a communications program such as an email client application, instant messaging application, chat application, telephone (e.g., VOIP) application, or the like. Execution of the second application when the removable storage device 125 is coupled to a respective client 102 is an event that may be monitored, recorded and/or reported by the first application 170 to the server 106.

In some other embodiments, the auto-run program 189 is stored in the non-secure partition 182, but nevertheless initiates automatic execution of the application 170. It is noted that while the application 170 is describe here as stored in the secure partition 184 (as shown in FIG. 3), in alternative embodiments the application 170 is stored in the non-secure partition 182. In yet other embodiments, all of the software and data elements shown in FIG. 3 are stored in a removable storage device that has only one partition, comprising a non-secure partition, or that has only non-secure partitions, and thus does not include a secure partition.

Figure 4A:
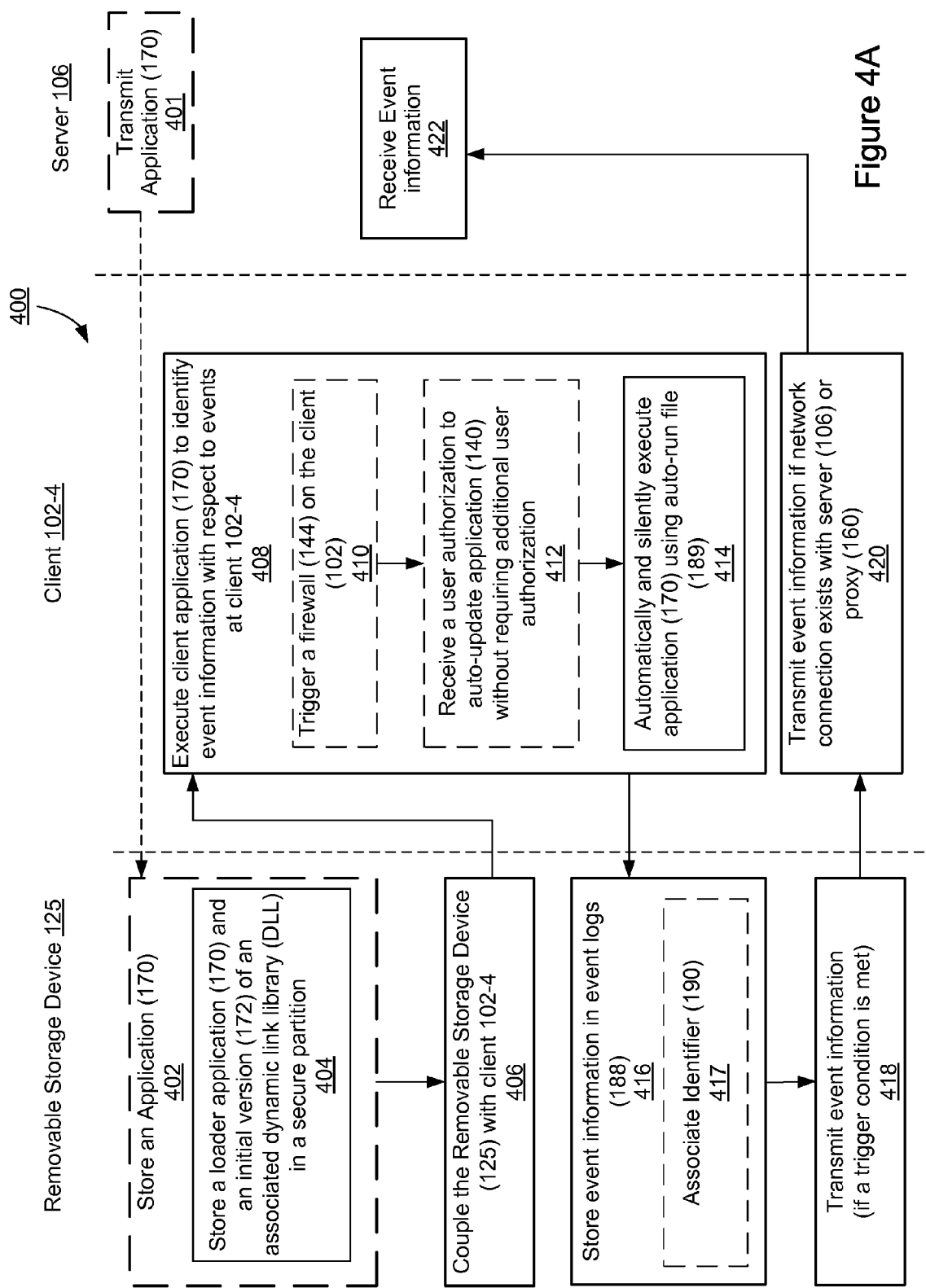

FIGS. 4A and 4B are flow diagrams of a process 400 for execution of an event data gathering application 170 according to some embodiments, when such an application is not resident on a client and is instead resident on a removable storage device that is coupled to or is in communication with a client. Optional operations are indicated by dashed lines. In some embodiments, as shown in FIG. 4A, process 400 is a process for executing client application 170 resident on removable storage device 125, which is coupled with client 102-4, and as shown in FIG. 4B, process 460 is a process for executing client application 170 resident on the removable storage device 125, which is no longer coupled with client 102-4 and is instead coupled with client 102-5.

In some embodiments, process 400 includes storing client application 170 (402). Client application 170 may be received and/or downloaded from server 106 (401). As shown in FIG. 3, client application 170 includes a loader application 171 and an associated initial dynamic link library (DLL) 172. In some embodiments, both the loader application 171 and the initial DLL 172 are stored in the secure partition 184 of a respective removable storage device 125 (404), and therefore cannot be erased by (or in the course of) ordinary operation of a client.

The removable storage device 125 is coupled with client 102-4 (406). Upon coupling, an auto-run function 189 stored on the removable storage device 125 causes a host operating system 816 on client 102-4 to execute client application 170 (408). The client application 170 is thus executed automatically, without requiring any user action. Optionally, the client application 170 can be executed in response to a user action (e.g., a command to execute the application). For example, if automatic execution of the client application 170 is blocked for any reason, the user of the client 102-4 can manually initiate execution of the client application 170.

In some embodiments, upon a first execution of application 170 at a respective client, a user authorization is required to enable client application 170 to communicate with locations (e.g., server 106) external to the client. In some embodiments, the first execution of the loader application 171 triggers a firewall 144 on client 102-4, which asks a user to authorize communications by the application 170 with locations external to client 102-4 (410). Further, in some embodiments, the user authorizes subsequent communications by the application 170 with locations external to client 102-4 without requiring additional user authorization (412). In some embodiments, the host operating system 816 of client 102-4 executes application 170, such that after requesting and obtaining the user authorization (if one is required), the application 170 is silently executed (414). Stated another way, after receiving such authorization, the application 170 performs communications with locations external to client 102-4 without requiring user authorization. Accordingly, execution of application 170 may not be visible to a user of client 102-4.

Application 170 records event information with respect to the local events at client 102-4. Examples of events for which event information may be recorded include: HTTP requests originating at client 102-4, activation (i.e., initiating execution) of one or more client applications 132 on client 102-4, and activation or execution of a respective second application 192 resident on the removable storage device 125 while coupled to the client 102-4. Other events for which event information is optionally recorded include the execution of the application 170 itself on client 102-4, and/or a time lapse event associated with the execution of the application 170 on client 102-4 measuring one or more lengths of time for which the application 170 has been executed.

In some embodiments, application 170 also records a current client real time clock (RTC) 150 timestamp at the occurrence of each event and/or assigns a unique sequence identification to each event, as is done by recording application 152, which is discussed below in reference to FIGS. 6A and 6B. In some embodiments, application 170 removes personal identifiable information (PII) from the event information, as is done by event application 134, which is discussed above in reference to FIGS. 2A and 2B.

Event information collected by application 170 is stored in one or more event data logs 188 (sometimes called event logs) in non-secure partition 182 of the removable storage device 125 (416). In some embodiments, the identifier 190 (FIG. 3) is associated with the event data logs 188 (417). The identifier 190 may be used by server 106 to associate event information with the particular removable storage device 125 from which it is received without knowing the identity or specific location of the user or the clients to which the device 125 has been coupled. In other words, the identifier 190 may be used by the server 106 to correlate events on multiple clients, all performed while device 125 is coupled to those clients, without the server 160 having access to information (e.g., personal identifiable information) that more specifically identifies the individual user of device 125.

Application 170 causes event data logs 188 to be uploaded to server 106 (418). In some embodiments, event information is transmitted only when at least one of a plurality of trigger conditions is met. The trigger conditions typically include one or more of: passage of a predetermined amount of time after a previous transmission of event information, collection of a predetermined amount of event information in the event data logs 188, and occurrence of a particular event or events at client 102-4. Back at client 102-4, event information is transmitted to server 106 using network interface 136 if a network connection exists with server 106 or proxy 160 (420).

At the server 106, network communication module 108 receives the event information from client 102-4 (422). As discussed elsewhere in this document, the event information from client 102-4 may be received at the server 106 via a proxy 160, after the proxy has removed PII from the event information. Event information may be stored by the server 106 in an event log 130, as discussed further in reference to FIG. 9. Optionally, at the server 106, an event association module 120 (FIG. 1, FIG. 9) optionally processes event information to identify correlations and patterns among the events that occur at a client, and to generate statistics and perform statistical analyses of the event information. At the server 106, event reconstruction module 110 optionally reconstructs at least one of: a chronological order of the events on a client (such as client 102-4) and the time when each event occurred at the client.

In some embodiments, event data logs 188 on a respective removable storage device 125, associated with event information with respect to events occurring at a first client, such as client 102-4, may not get uploaded to server 106 while the device 125 is still coupled to client 102-4. This may happen, for instance, if there is a break in a network connection between client 102-4 and the server 106, or if there is a break in the connection between client 102-4 and removable storage device 125, such as may happen if a user removes the removable storage device 125 from the client 102-4. In such an event, event logs 188 remain stored in the non-secure partition 182 until the removable storage device 125 is connected to a client, such as any one of clients 102-4 and 102-5, and that client is in communication with the server 106.

Thus, in some embodiments, server 106 may receive from a first client 102-4, during one or more first time periods, event information with respect to one or more events that occur at the first client 102-4. During one or more second time periods, server 106 may receive from second client 102-5 event information with respect to one or more events that occur at the second client 102-5. Additionally, during one or more of the second time periods, server 106 may receive from second client 102-5 event information with respect to one or more events that occurred at the first client 102-4. This last example of event information sent to the server 106 is event information stored in the event logs 188 of the removable storage device 125 while the device 125 is connected to the first client 102-4 but which is sent to the server 106 while the device 125 is connected to a second client 102-5.

Further, in some embodiments, server 106 is able to associate event information with the particular removable storage device 125 where it is stored, for instance, using unique identifier 190, which in some embodiments is transmitted along with event information transmitted to the server 106.

Further, optionally, in some embodiments, server 106 is able to associate event information with events occurring at a particular client, such as client 102-4 or client 102-5, for instance, using a client identifier, which in some embodiments, may be assigned by the application 170, and further may be transmitted along with event information transmitted to the server 106. To avoid providing personally identifiable information, the client identifier may be, in effect, an extension of the unique identifier 190. In these embodiments, the client identifier is a "generic client identifier" (i.e., not globally unique) that provides only enough information to distinguish between the various clients 102 that are used in conjunction with the removable storage device. For example, the first client 102 used with the removable storage device 125 may receive a client identifier of 001, the second client 102 used with the removable storage device 125 may receive a client identifier of 002, and so on. Sufficient client identifying information (e.g., a MAC address) may be retained in the removable storage device 125 to enable the application 170 to determine which client identifier to associate with each event, while still providing only the generic client identifier (along with the unique identifier 190) to the server 106 when transmitting event information to the server.

In some embodiments, as shown in FIG. 4B, process 460 is a process for executing client application 170 resident on the removable storage device 125, which is no longer coupled with client 102-4 and is instead coupled with client 102-5 (464). Process 460 is similar to process 400, except that event data logs 188 may store event data with respect to a previous client 102-4 with which the removable storage device 125 was coupled. Once the application 170 is executed by client 102-5 (468), application 170 causes additional event information with respect to client 102-5 to be stored in the event data logs 188 (476). In some embodiments, the first execution of the loader application 171 triggers a firewall 144 on client 102-5, which asks a user to authorize communications by the application 170 with locations external to client 102-5 (470). Further, in some embodiments, the user authorizes subsequent communications by the application 170 with locations external to client 102-5 without requiring additional user authorization (472). In some embodiments, the host operating system 816 of client 102-5 executes application 170, such that after requesting the user authorization (if one is required), the application 170 is silently executed (474) by client 102-5. Accordingly, execution of application 170 may not be visible to a user of client 102-5.

The identifier 190 stored on the removable storage device is associated (on the removable storage device 125) with the newly stored event information (478). Event information with respect to client 102-4 (which is a client to which the removable storage device was previously coupled) and/or event information with respect to client 102-5 are transmitted to the server (480, 482 and 484) if a communication connection to the server exists.

FIG. 5A is a flow diagram of a process 500 for auto-updating an application without requiring repeated user authorization according to some embodiments. Optional operations are indicated by dashed lines.

In some embodiments, process 500 includes installing client application 140 (510). Client application 140 may be received and/or downloaded from server 106 (508). Installing client application 140 includes installing a loader application 141 and an associated dynamic link library (DLL) 142 (512). In some embodiments, loader application 141 is a relatively simple application that does not need to be updated very often, if ever. In some embodiments, loader application 141 runs in a process having an elevated privilege level (e.g., medium or high privilege level on Windows Vista®) in the client device's operating system and may be responsible for communications with the server 106, for download of updates, for upload of data and any other necessary communication between client 102-3 and server 106 (or between client 102-3 and proxy 160). For instance, in some embodiments, a process (on client 102-3) in which the loader application 141 executes communicates with server 106. Loader application 141 makes one or more procedure calls or function calls to programs or functions in the associated DLL 142. On the other hand, in some embodiments, DLL 142 functions as a core application that is responsible for all the functionality and features of the client application 140, including communications with the server. In some embodiments, the DLL 142 can communicate directly with the server because it is loaded in the same process as the loader application 141. Alternately, in some other embodiments, DLL 142 communicates with loader application 141 for any server communication and the DLL 142 is auto-updated by loader application 141 to provide new features, security updates, bug fixes and other changes.

In some embodiments, upon a first execution of the loader application 141, a user authorization is required to enable client application 140 to communicate with locations (e.g., server 106) external to client 102-3 (514). In some embodiments, the first execution of the loader application 141 triggers a firewall 144 on client 102-3, which asks a user to authorize communications with locations external to client 102-3 (516). Further, in some embodiments, the user authorizes communications with locations external to client 102-3 without requiring additional user authorization (518).

Upon the first and subsequent executions, the loader application 141 calls a function or procedure in the dynamic link library 142 (520). In some embodiments, the loader application 141 functions to load the dynamic link library 142 and calls a function or procedure in it. The dynamic link library 142 includes multiple functions, or procedures such as a function to request auto-updates. The dynamic link library 142 includes an auto-update function or procedure that sends requests to server 106 for auto-updates (524). In some embodiments, the dynamic link library 142 requests server 106 for auto-updates to itself periodically. For example, if the client application 140 remains loaded in the client, the dynamic link library 142 (via loader application 141) requests server 106 for auto-updates to itself each time a predefined amount of time (e.g., one day, or N days) has passed since the last auto-update request. In another example, each time the client application 140 is executed, the dynamic link library 142 (via loader application 141) sends a request to server 106 for an auto-update, unless it has already sent a request for an auto-update to the server within the predefined amount of time.

At the server 106, network communication module 108 (FIG. 1, FIG. 9) receives the request for auto-updates from client 102-3 (526). Network communication module 108 handles a request from client 102-3 for an update to DLL 142. The DLL update request may be passed by network communication module 108 to DLL update module 143, which provides a DLL update (if an update is available) to requesting client 102-3 (528). DLL update module 143 provides an update to DLL 142, and not to the loader application 141. The application 140 receives the auto-update, which is provided to DLL 142 during one or more executions of the loader application subsequent to the first execution of the client application 140 (530). In some embodiments, the application 140 automatically installs the received update, without requesting user authorization, thereby providing a completely automatic update of the application (532).

Optionally, the auto-update request from the client includes a current DLL version number, value or other parameter specifying the current version of the application that is installed at the requesting client. This value is used by the DLL update module 143 to determine if it has an update for the requesting client, and if so, what update to send to the requesting client. In the event that the DLL update module 143 does not have any updates for the requesting client, the DLL update module 143 returns a predefined value or message to the requesting client, indicating that no updates are currently available.

Because updates of the DLL 142 do not cause the loader application 141 to be updated, the application 140 appears to the client operating system to remain unchanged. As a result, the next time the application 140 attempts to send event data to the server, or to send an auto-update request, the original user authorization (514) for application 140 to send data to locations (e.g., servers) external to the client remains valid and in effect, and therefore no firewall warnings (or other requests for user authorization) are triggered.

In some other embodiments, the process 500 does not include loading (510) an application 140 because the application 140 is pre-installed on a removable storage device (e.g., see FIG. 3) prior to the performance of process 500.

In some embodiments, the application 140/170 to be updated has multiple modules, but does not include a DLL. In such embodiments, the client 102 still requests updates for the application 140/170 (see operation 524, FIG. 5A), and receives one or more updated modules when updates are available (see operations 526, 528, 530, FIG. 5A). The updated modules are installed at the client 102, for example in the same removable storage device in which the initial version of the application 140/170 is stored. After installation, during execution of the application 140/170, the updated one or more modules are used in place of the earlier versions of the same modules of the application 140/170. In these embodiments, the application updating process may still use the process shown in FIGS. 5A, 5B and/or 5C, but with each reference to the "DLL" replaced by a corresponding reference to the one or more modules of the application 140/170 that are to be updated.

Figure 5B:
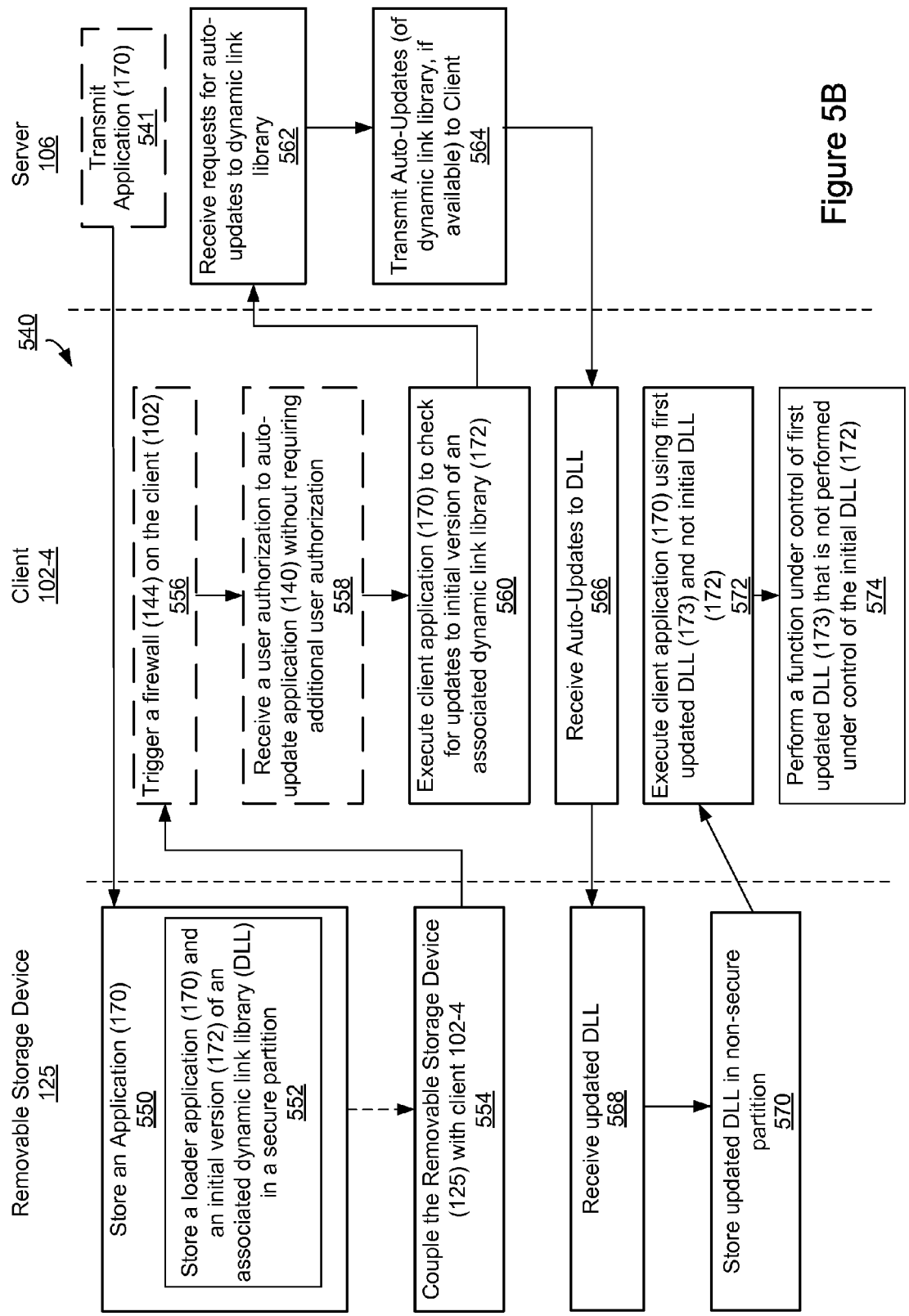
FIGS. 5B and 5C are flow diagrams of a process for auto-updating an application resident on a removable storage device without requiring repeated user authorization according to some embodiments.
Figure 5C:
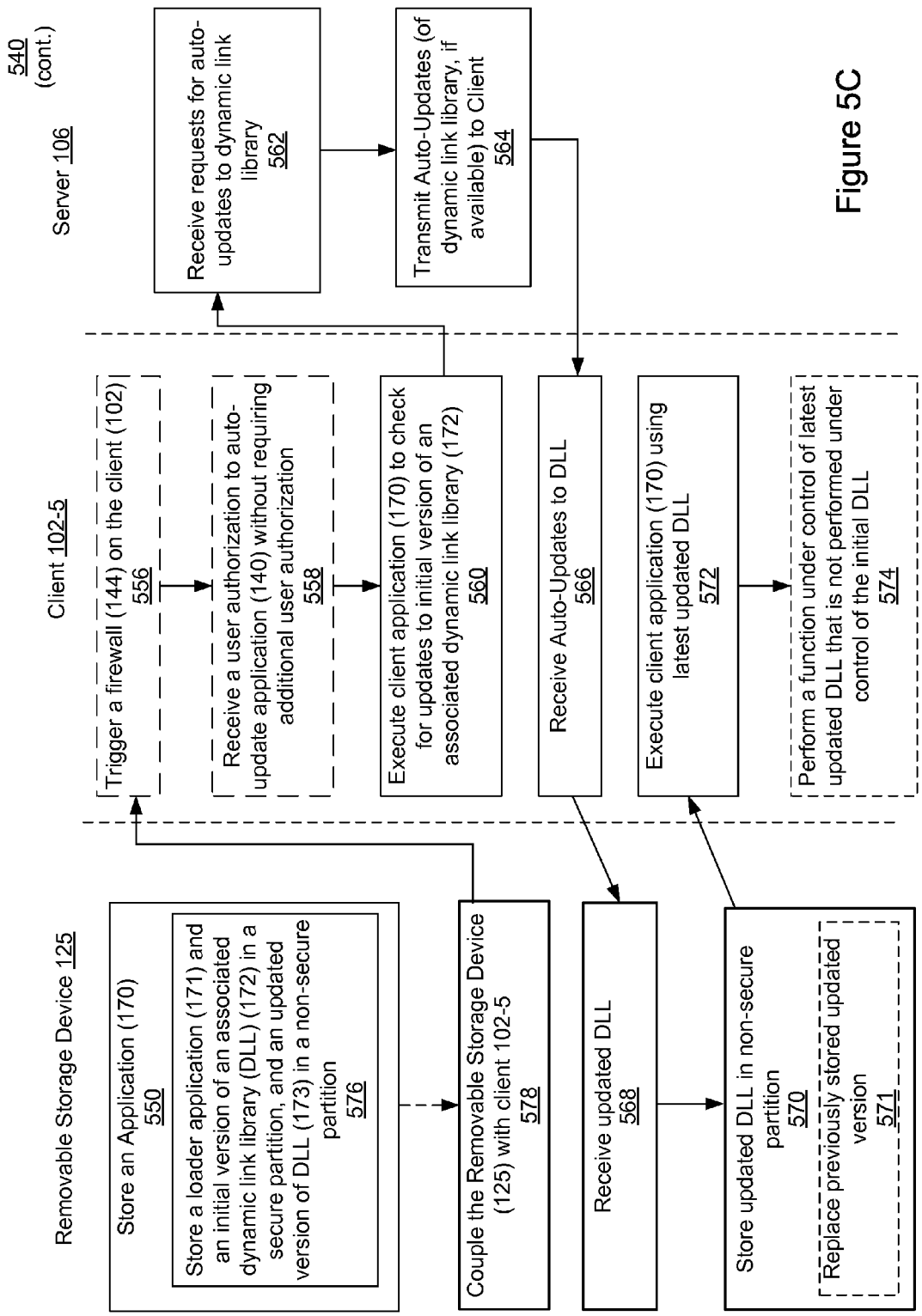

FIGS. 5B and 5C are flow diagrams of a process 540 for auto-updating an application without requiring repeated user authorization according to some embodiments when such an application is not resident on a client and is instead resident on a removable storage device that is coupled to or is in communication with a client. Optional operations are indicated by dashed lines. In some embodiments, as shown in FIG. 5B, process 540 is a process for auto-updating client application 170 resident on removable storage device 125, which is coupled with client 102-4. As shown in FIG. 5C, process 540 is a process for auto-updating client application 170 resident on the removable storage device 125, which is no longer coupled with client 102-4 and is instead coupled with client 102-5.

In some embodiments, process 540 includes storing client application 170 (550). Client application 170 may be received and/or downloaded from server 106 (541). As shown in FIG. 3, client application 170 includes a loader application 171 and an associated initial dynamic link library (DLL) 172. In some embodiments, both the loader application 171 and the initial DLL 172 are stored in a secure partition 184 of the removable storage device 125 (552), and therefore, cannot be erased. In some embodiments, loader application 171 is a relatively simple application that does not need to be updated very often, if ever.

The removable storage device 125 is coupled with client 102-4 (554). For example, the removable storage device 125 may be decoupled from client 102-4 after the client application 170 has been stored on it, and then later reconnected to client 102-4. Alternately, the removable storage device 125 may remain coupled to client 102-4 after the client application 170 has been stored on it. In yet other embodiments, the client application 170 may have been stored on the removable storage device 125 prior to the first coupling of the device 125 to client 102-4.

Upon coupling the removable storage device 125 to client 102-4, an auto-run function 189 stored on the removable storage device 125 causes a host operating system 816 on client 102-4 to execute client application 170 (see FIG. 4A and above discussion of operation 408). In some embodiments, upon a first execution of the loader application 171, user authorization is required to enable client application 170 to communicate with locations (e.g., server 106) external to client 102-4 (556). In some embodiments, the first execution of the loader application 171 triggers a firewall 144 on client 102-4, which asks a user to authorize communications by application 170 (or by loader application 171) with locations external to client 102-4. Further, in some embodiments, the user authorizes both current and subsequent communications with locations external to client 102-4 without requiring additional user authorization (558).

In some embodiments, the first execution of the client application 170 on the first client computer to which the removable storage device 125 is coupled causes the host operating system 816 of that client (e.g., client 102-4) to execute the initial DLL 172 (see FIG. 3 and above discussion of FIG. 3), which communicates with server 106 to check for updates to the initial DLL 172 (560). In some embodiments, loader application 171 runs in a process on client 102-4 having an elevated privilege level (e.g., medium or high privilege level on Windows Vista®) in the client device's operating system and may be responsible for communications with the server 106, for download of updates. For instance, in some embodiments, a process in which the loader application 171 executes communicates with server 106.

At the server 106, network communication module 108 (FIG. 1, FIG. 9) receives the request for auto-updates from the client 102-4 (562). Network communication module 108 handles a request from the client 102-4 for an update to DLL 172. The DLL update request may be passed by network communication module 108 to DLL update module 143, which provides a DLL update (if an update is available) to requesting client 102-4 (564). The server 106 (e.g., DLL update module 143, shown in FIG. 1) provides an update to DLL 172 if any update is available (564), but typically does not provide an update to the loader application 171. The client 102-4 receives the auto-update (566), which is provided to removable storage device 125 for storage.

In some embodiments, optionally, the auto-update request received from the client 102-4 includes a current version number, value or other parameter specifying the current version of the application that is installed at the requesting client. This value is used by the DLL update module 143 to determine if it has an update for the requesting client, and if so, what update to send to the requesting client. In the event that the DLL update module 143 does not have any updates for the requesting client, the DLL update module 143 may return a predefined value or message to the requesting client, indicating that no updates are currently available.

The removable storage device 125 receives the updated client application (e.g., an updated DLL 173) (568) and stores the client application in a non-secure partition 182 (FIG. 3) of the removable storage device (570). The updated client application or DLL 173 is stored in the non-secure partition and therefore, may be accidentally erased, for instance, by a user erasing contents of the removable storage device's non-secure partition 182. However, the initial DLL 172 cannot be accidentally erased because it is stored in the secure partition 184 of the removable storage device 125.

Back at the client 102-4, the client application 170 is executed using the updated DLL 173 (stored in the non-secure partition of the removable storage device 125) and not the initial DLL 172 (572). However, if no updates were received, the client application 170 is executed using initial DLL 172. The loader application 171, upon execution at the client 102-4, calls a function or procedure in the DLL 173. In some embodiments, the loader application 171 functions to load the DLL 173 and calls a function or procedure in it. The dynamic link library 172 or 173 includes multiple functions, or procedures. The dynamic link library 172 or 173 includes an auto-update function or procedure that sends requests to server 106 for auto-updates (524). In some embodiments, the dynamic link library 172 or 173 requests server 106 for auto-updates to itself periodically. For example, if the client application 140 remains loaded in the client, the dynamic link library 172 or 173 (via loader application 171) requests server 106 for auto-updates to itself each time a predefined amount of time (e.g., one day, or N days) has passed with the last auto-update request. In another example, each time the client application 170 is executed, the dynamic link library 172 or 173 (via loader application 171) sends a request to server 106 for an auto-update, unless it has already sent a request for an auto-update to the server within the predefined amount of time.

Optionally, client 102-4 performs a function under control of the updated DLL 173 that is not performed under control of the initial DLL 172 (574). For example, updated DLL 173 may collect information about a type of event not processed by initial DLL 172. In another example, updated DLL 173 may collect different information for events, or may remove additional information from collected event related information, compared with the initial DLL 172.

FIG. 5C illustrates a flowchart of a process 550 when the removable storage device 125 has been disconnected from client 102-4. The removable storage device already stores the loader application 171 and the initial DLL 172 in its secure partition, and the updated DLL 173 in its non-secure partition (576). The removable storage device 125 is coupled with client 102-5 (578). The remaining process is similar to that in FIG. 5B, except that when another updated DLL is received from server 106, it is stored in the non-secure partition of the removable storage device (570) and may replace the previously stored updated DLL (571).

Figure 6A:
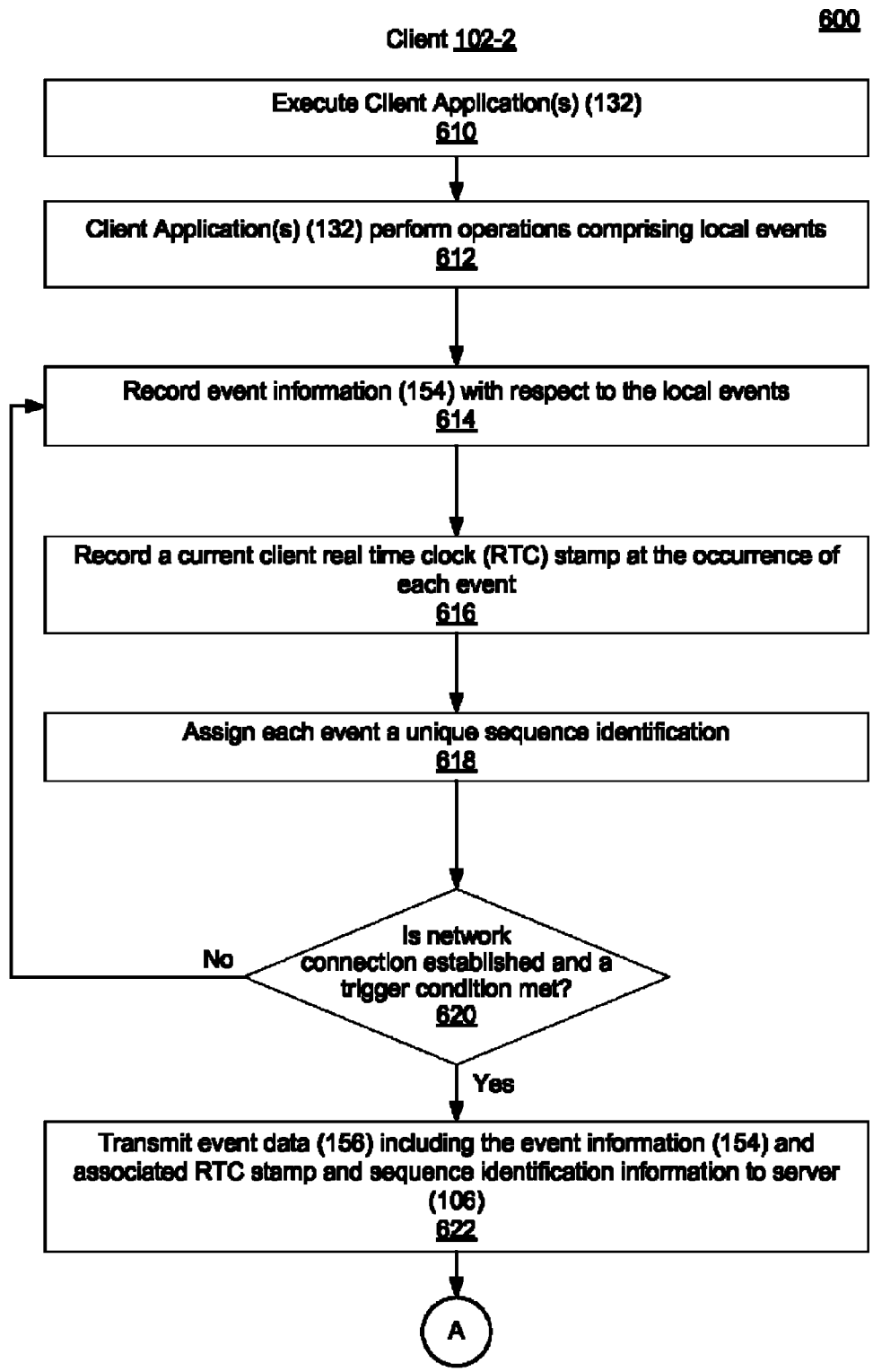
FIGS. 6A-6B are flow diagrams of a process for recording events without reliable timestamps according to some embodiments.
Figure 6B:
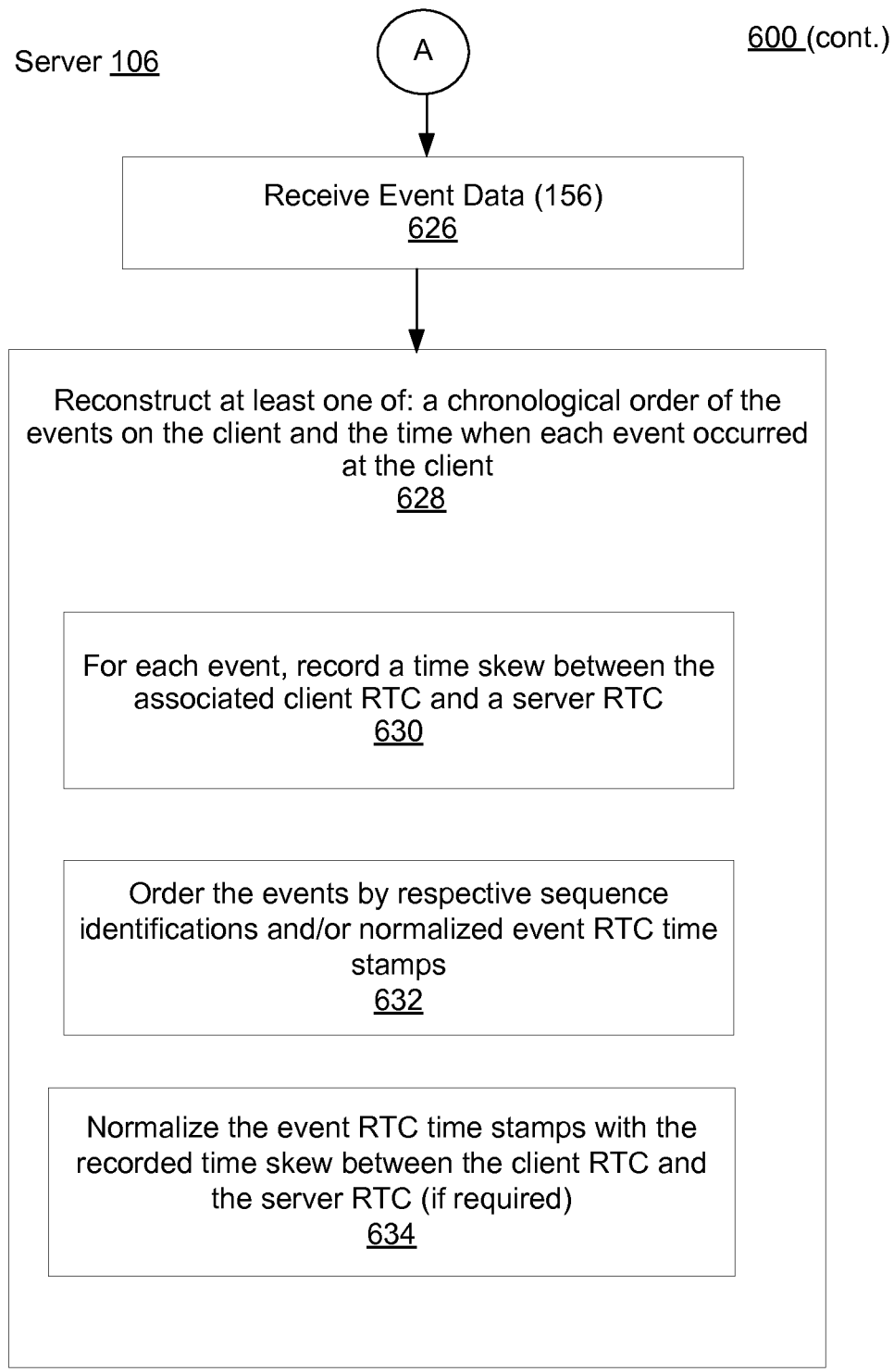

FIGS. 6A and 6B are flow diagrams of a process 600 for recording events without reliable timestamps according to some embodiments. FIGS. 6A and 6B illustrate the client-side and the server-side operations respectively. In some embodiments, some of the client-side operations are performed by recording application 152 and the server-side operations are performed by event reconstruction module 110.

In some embodiments, a user at client 102-2 executes one or more client applications 132 (610). As discussed, a client application 132 can be a web browser or an email application. Client application(s) 132, when executed by client 102-1, perform operations comprising local events at the client 102-1 (612). Examples of local events may include a user accessing a URL, a user accessing a client application 132, a user performing operations within an accessed URL or client application 132, a user clicking on a toolbar button, and so on. Further examples of a local event may include user-initiated changes to the client RTC time and/or changes to the client RTC time due to other events on the client 102-2.

Recording application 152 records event information 154 with respect to the local events at the client 102-2 (614). Recording application 152 also records a current client real time clock (RTC) 150 timestamp at the occurrence of each event (616). As discussed, the client RTC 150 timestamp may not be accurate for a number of reasons. For instance, the client RTC 150 timestamp may have been manually changed or have been changed by other events on the client 102-2. Therefore, recording application 152 assigns a unique sequence identification to each event (618). The client RTC 150 timestamp is used in conjunction with the unique event sequence identification by server 106 to determine the chronological order of events at the client 102-2 or time of occurrence of the events at the client 102-2, as discussed in reference to FIG. 6B.

In some embodiments, recording application 152 assigns each successive event a monotonically increasing integer value as its unique sequence identification. In some embodiments, recording application 152 assigns each successive event two integer values as its unique sequence identification. In some embodiments, the two integer values comprise a session value and a sequence value. The session value remains constant in value between executions of recording application 152 and changes value when a new execution of the recording application 152 begins. The sequence value changes monotonically in value while the session value remains constant and successive events occur at the client 102-2. In most implementations, recording application 152 assigns sequence identifications that monotonically increase in value with successive events. Accordingly, the sequence identification value of an event that happened later in time will be greater than the value of all events that have happened before that event. However, in an implementation in which recording application 152 assigns sequence identifications that monotonically decrease in value with successive events, the sequence identification value of an event that happened later in time will be less than the value of all events that have happened before that event.

In some embodiments, recording application 152 determines if a network connection is established between the client 102-2 and the server 106 and at least one trigger condition is met (620). The trigger conditions typically include one or more of: passage of a predetermined amount of time after a previous transmission of event data 156, collection of a predetermined amount of event data 156 or event information 154 at the client 102-2, and occurrence of a particular event or events at the client 102-2. For instance, a client 102-2 and/or a recording application 152 restart may constitute an event that acts as a trigger condition.

If a network connection is not established between the client 102-2 and the server 106 and/or at least one trigger condition is not met, process 600 continues at block 614. Otherwise, at block 622, recording application 152 transmits, via network interface 136, event data 156 including the event information 154 and associated client RTC stamp and sequence identification information to server 106. In some embodiments, also included in the event data 156 is the current client RTC 150 time, indicating the time of transmission of the event data from the client 102-2. In some embodiments, event data 156 is transmitted to a proxy 160 before being transmitted to server 106.

Referring to FIG. 6B, network communication module 108 at server 106 receives the event data 156 (626). The network communication module 108 passes the event data 156 to event reconstruction module 110, which reconstructs at least one of: a chronological order of the events on the client 102-2 and the time when each event occurred at the client 102-2 (628).

Event reconstruction module 110 records a time skew between the associated client RTC 150 and a server RTC 112 upon receipt of the event data at the server 106 (630). For example, upon receipt of the event data (including a recorded client RTC timestamp, indicating the time of transmission of the event data from the client 102-2), event reconstruction module 110 records a server RTC 112 time and determines a skew between the recorded client RTC 150 timestamp and the server RTC 112 time. The time skew and event data may be stored in an event log 130 (FIG. 1) associated with server 106.

In some embodiments, after the log of all events is recorded on server 106, the event reconstruction module 110 uses heuristics based on the recorded earlier data to reconstruct the chronological order of the events on the client 102-2 and the time when each event occurred on the client 102-2.

The event reconstruction module 110 uses sequence identification information associated with each event to prepare an ordering of the events (632). Event reconstruction module 110 normalizes the event (i.e., client) RTC timestamps (as provided by the client RTC 150) with the recorded time skew between the client RTC and the server RTC, if required (634). In some embodiments, if an ordering of the events by respective sequence identifications does not match a chronological order of the events based on event (i.e., client) RTC timestamps, event reconstruction module 110 normalizes the event RTC timestamps with the recorded time skew between the client RTC and the server RTC.

The timestamp normalization converts each event timestamp to be relatively accurate to the server RTC 112. Assuming that the server RTC is accurate, accurate timestamps can be assigned to the events that occurred on the device. In case the event order based on the assigned normalized timestamps does not agree with event sequence identification order, in some embodiments, the event reconstruction module 110 can apply heuristics to normalize either the timestamps or the sequence identifications depending on the expected reliability of both. Event sequence identifications usually can be implemented more reliably than the event timestamps. Another benefit of using both timestamps and sequence identifications is that events that occur within a shorter period of time than the client RTC 150 resolution can still be assigned accurate chronological order. For example if the client RTC 150 has resolution of 17 milliseconds (ms) and a few events occur within 3 ms of each other, a plurality of the event will contain the same timestamp, but each event will have unique sequence identification that reflects the correct order of occurrence.

Figure 7A:
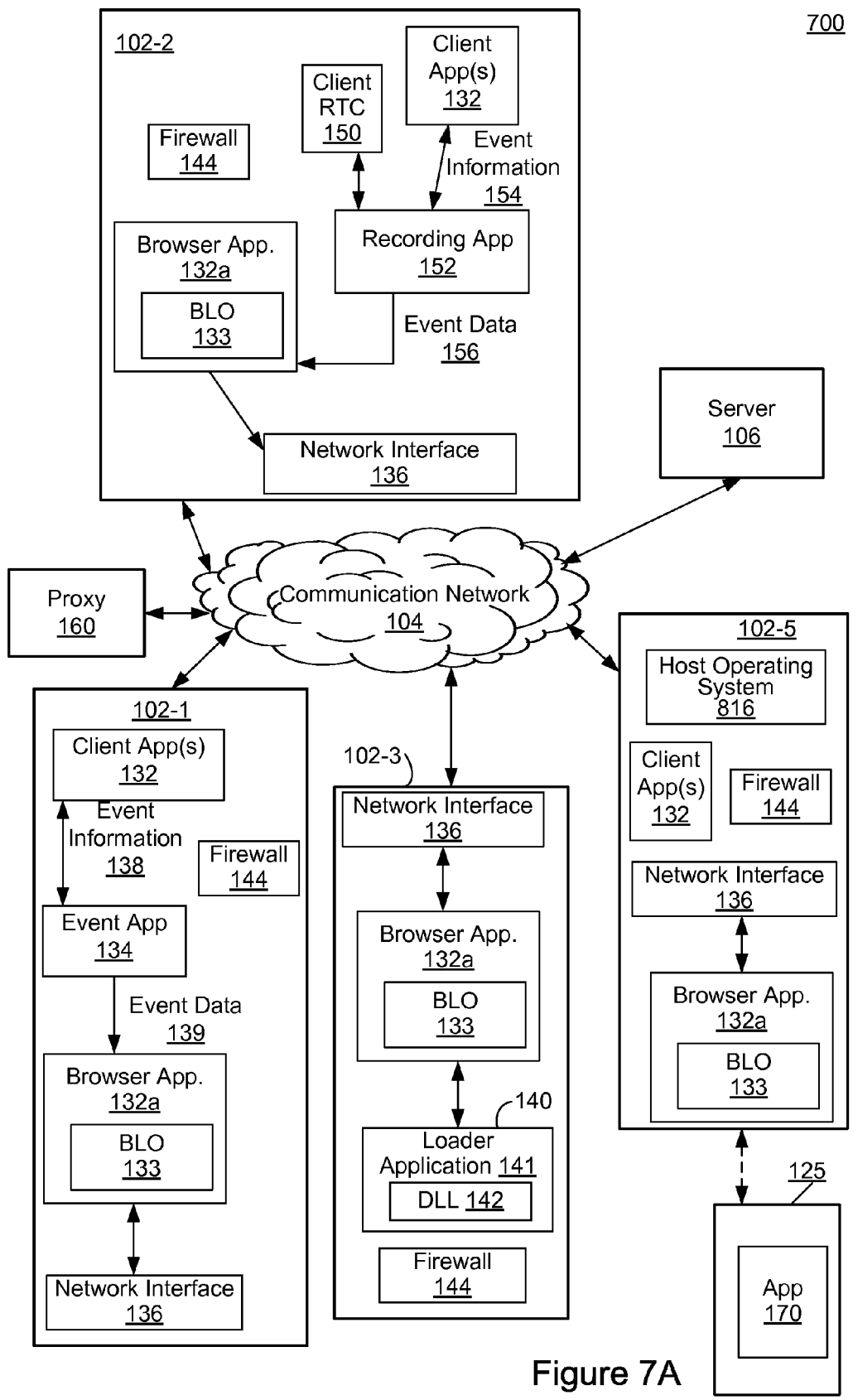
FIG. 7A is a diagram of a distributed system in which embodiments of the present invention may be practiced.
Figure 7B:
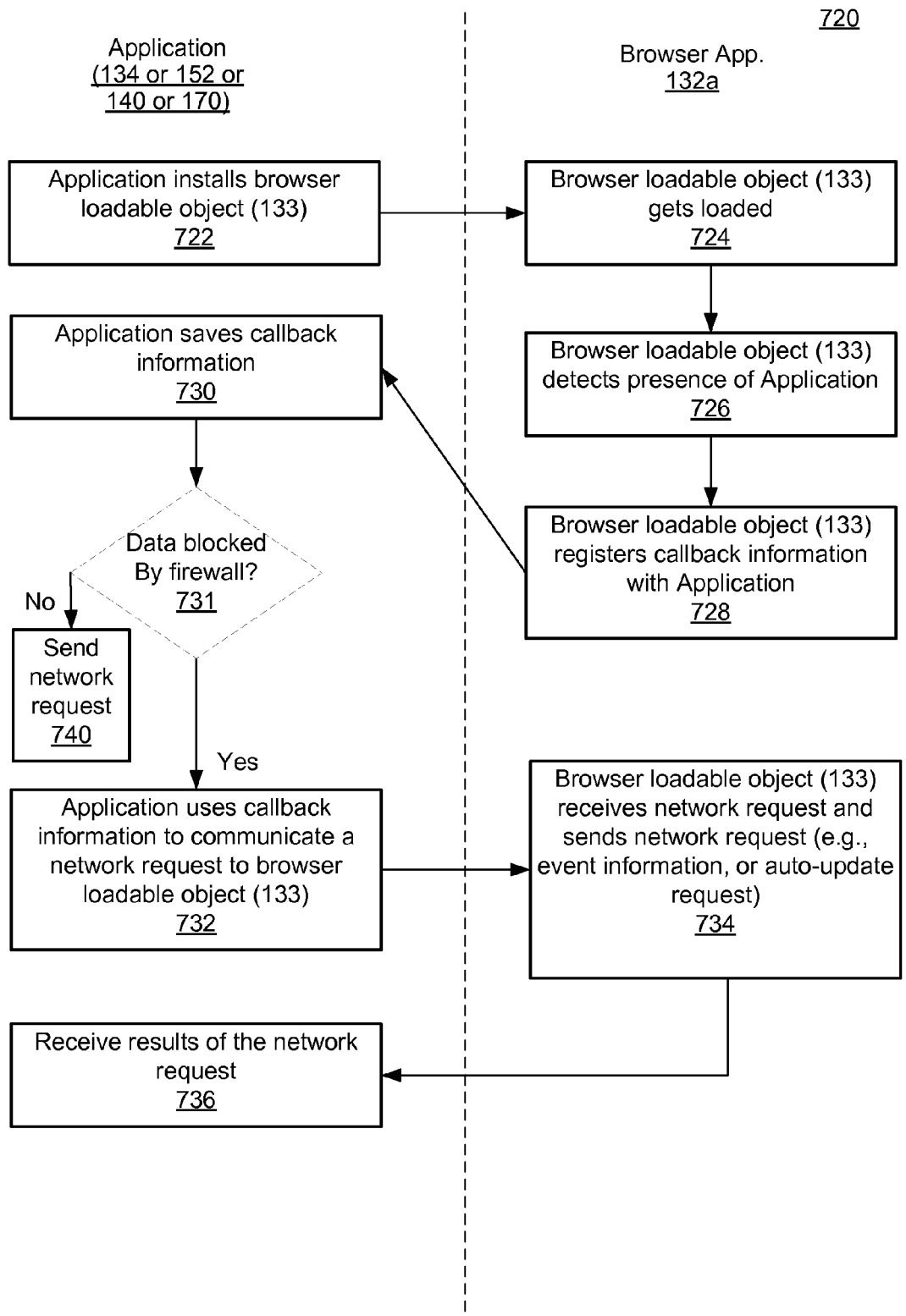
FIG. 7B is a flow diagram of a process of communicating with a network using a client application, in accordance with some embodiments.

FIG. 7A is a block diagram of a system 700 and FIG. 7B is a flowchart of a process 720 for a network communication mechanism. System 700 is similar to distributed system 100 in FIG. 1, except that communications between an application (such as, client application 140 (see client 102-3), application 170, event application 134 and recording application 152) and network 104 occur via a mechanism that involves a client application resident on the client 102, and that is trusted by a firewall 144 resident on the client 102. As discussed above, the trusted client application is typically a browser application 132a, although it can also be a mail application, a chat application, or any other application that can communicate with communications network 104. A trusted client application is an application whose communications will be not blocked by the firewall.

Browser application 132a maybe a web browser application, such as Internet Explorer® (a trademark of Microsoft Corporation), Mozilla Firefox® a trademark of Mozilla Corporation), Google Chrome (a trademark of Google Inc.), etc. Specifically, and as discussed further in reference to FIG. 7B, network data is communicated between an application (such as, client application 140, application 170, event application 134, or recording application 152) and network 104 using a browser loadable object 133, which is an object that can be loaded by the browser application 132a. In some embodiments, the browser loadable object 133 is installed by the application (such as, client application 140, application 170, event application 134, or recording application 152). The browser application 132a may already be trusted by a firewall 144 on the client 102, and therefore, may be allowed to send and receive network data, while the application (such as, client application 140, application 170, event application 134, or recording application 152) may not.

In some embodiments, process 720 of FIG. 7B begins with an application (such as, client application 140, application 170, event application 134 or recording application 152) installing a browser loadable object 133 (722). In some embodiments, the browser loadable object 133 can be a browser helper object "BHO", a browser plug-in, a browser extension, and the like. The browser loadable object 133 gets loaded inside the browser application 132a (724). Upon being loaded, the browser loadable object 133 detects the presence of the application (such as, client application 140, application 170, event application 134, or recording application 152), if the application is running (726). The browser loadable object 133 communicates with the application using a remote procedure call (RPC) and registers callback information with the application (728). The application saves the callback information (730).

When the application (such as, client application 140, application 170, event application 134, or recording application 152) needs to communicate with communications network 104, but is unable to do so, e.g., when data communication is blocked by a firewall 144 (731), the application uses the stored callback information to communicate a network request to the browser loadable object 133 (732). Optionally, the mechanism used to communicate this request is a remote procedure call (RPC) request from the application to the browser loadable object. In some embodiments, this mechanism is used upon a determination that event information is being blocked from being sent to the communications network 104 by a firewall at the client 102 (731); otherwise, a network request (such as, a request to a server 106 to transmit an auto-update, or a data upload to server 106) is directly sent by the application to the communications network 104 using network interface 136 at client 102.

The browser loadable object 133 receives the RPC request from the application and sends a network request with the parameters specified in the RPC callback from the application (734). In some embodiments, the browser loadable object 133 sends the network request to a server 106, or to a server 106 via a proxy 160. Results of the network request (such as one or more of: a return code, return data, an auto-update from server 106, an acknowledgement that a data upload to server 206 was successful, etc.) are transferred back to the application (736) as a response to the RPC initiated by the application (in 732).

In some embodiments, the registration phase (728) of process 720 is avoided. Accordingly, instead of registering callback information for a remote procedure call, a Component Object Model (COM) object is placed in a Running Object Table (ROT), and an operating system mechanism (such as a mutex or queue) is used to enable the application to get hold of the COM object and perform a RPC callback when the application needs to send a network request. Further, instead of RPC, other mechanisms, such as shared memory, registry, and so on, may be used to perform the cross-process communication.

Figure 8:
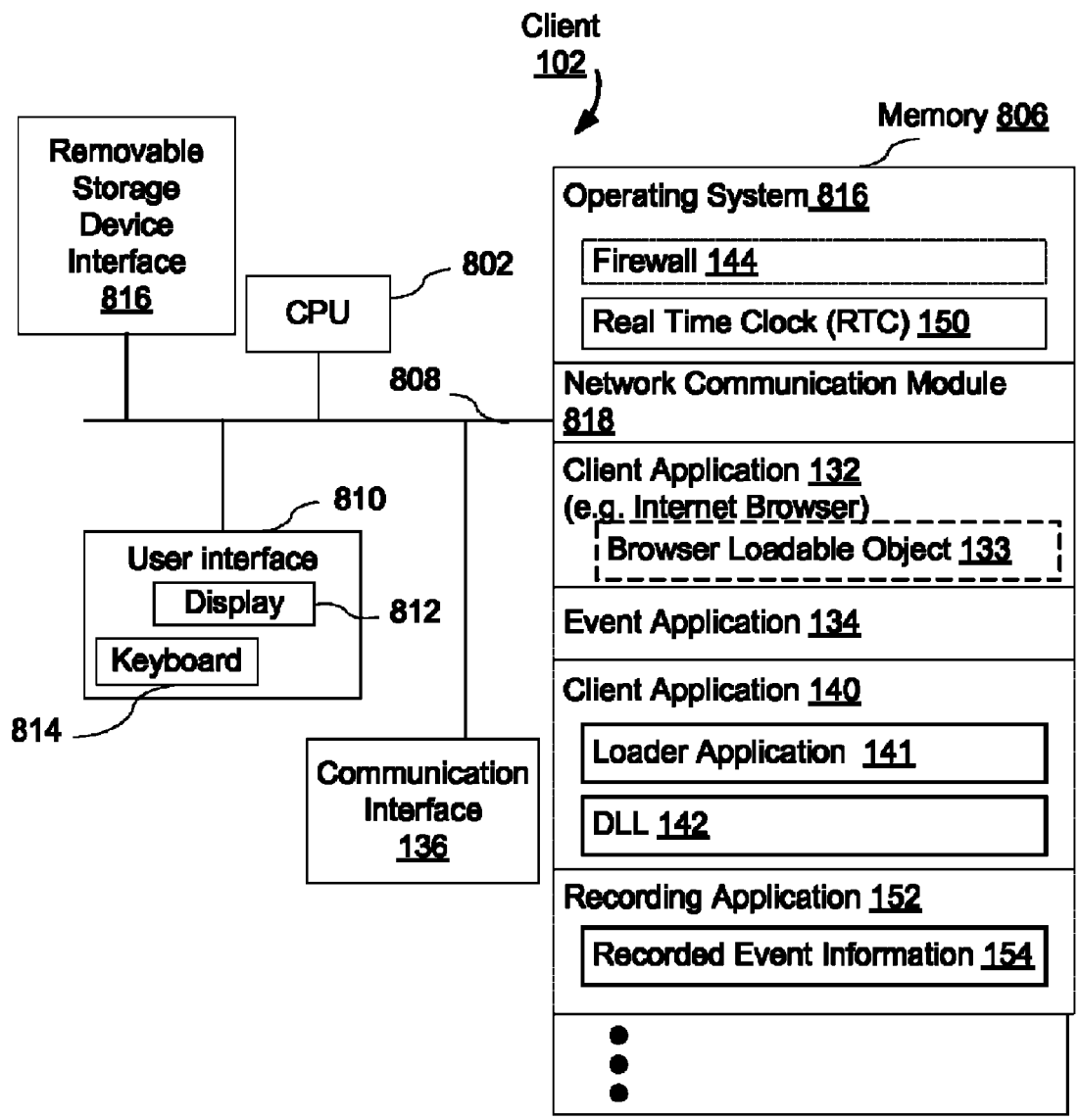
FIG. 8 is a block diagram of a client according to some embodiments.

FIG. 8 is a block diagram of a client 102 (i.e., a client system or device) according to some embodiments. The client 102 typically includes one or more processing units (CPUs) 802, one or more network or other communications interfaces 136, memory 806, and one or more communication buses 808 for interconnecting these components. The communication buses 808 may include circuitry (sometimes called a chipset) that interconnects and controls communications between system components. The client 102 optionally (but typically) includes a user interface 810, such as a display 812 and a keyboard 814. The client 102 optionally (but typically) includes an interface 816 (e.g., a USB interface) to interface with a removable storage device, such as a removable storage device 125. Stated another way, the interface 816 is configured to enable a removable storage device to be coupled to the client 102.

Memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from the CPU(s) 802. Memory 806, or one or more of the non-volatile memory devices in memory 806 comprise a computer readable storage medium that stores one or more programs for execution by one or more processors. In some embodiments, memory 806 or the computer readable storage medium of memory 806 stores the following programs, modules and data structures, or a subset thereof:

an operating system 816 that includes procedures for handling various basic system services and for performing hardware dependent tasks;

a firewall 144 that is either included in operating system 816, or that interoperates with operating system 816, for controlling network traffic to and from client 102 and permitting or denying communications;

a real time clock 150 that operates as a computer clock;

a network communication module 818 that is used for connecting the client 102 to other computers via the one or more communication network interfaces 136 and one or more communication networks 104, such as the Internet, other wide area networks, local area networks, metropolitan area networks, and the like;

a client application 132 (e.g., a browser application) that can permit a user to interact with the client 102 as described above;

an event application 134 for identifying event information with respect to at least some of the local events at the client and removing personal identifiable information (PII) from the event information to produce event data that is to be transmitted to a server;

an application 140 (which may be the event application 134) that includes a loader application 141 and a dynamic link library 142, such that the dynamic link library 142 and not the loader application 141 is auto-updated without requiring user input; and a recording application 152 for recording event information 154 with respect to events that occur at the client, recording a current client real time clock (RTC) timestamp at the occurrence of each event, and assigning each event a unique sequence identification.

Each of the above identified elements of the client 102 may be stored in one or more of the previously mentioned memory devices of memory 806, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 806 may store a subset of the modules and data structures identified above. Furthermore, memory 806 may store additional modules and data structures not described above.

Figure 9:
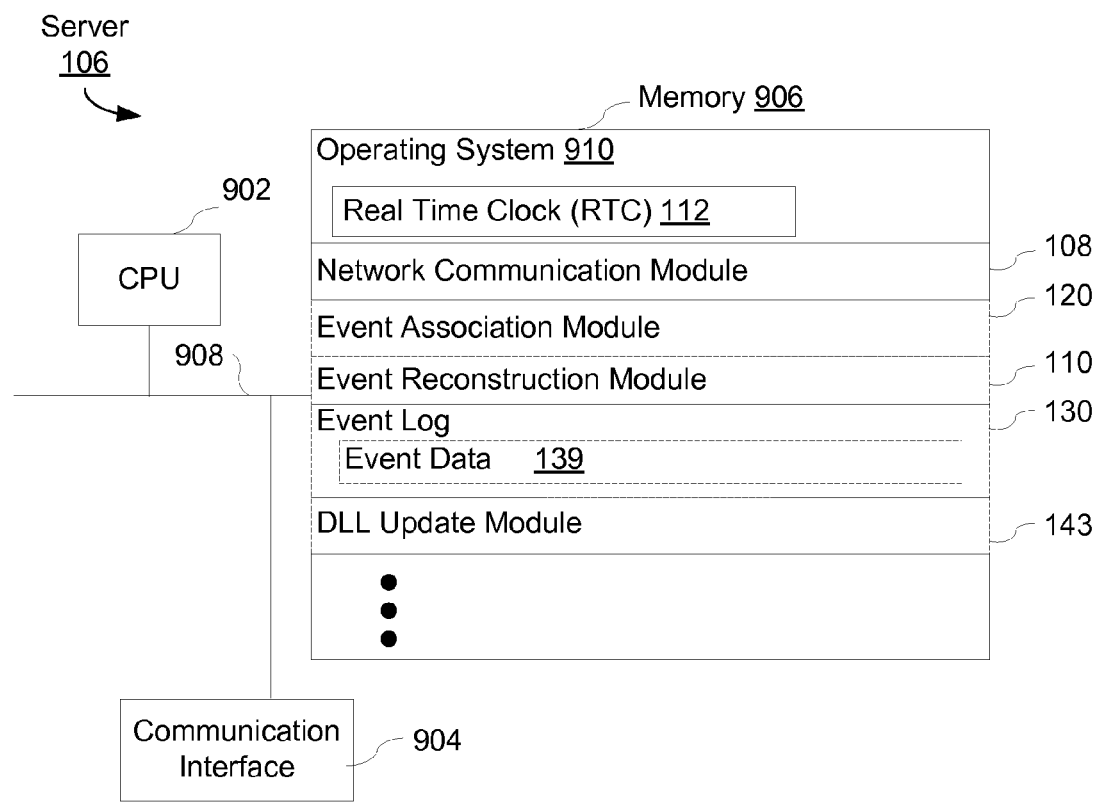
FIG. 9 is a block diagram of a server according to some embodiments.

FIG. 9 is a block diagram of a server system 106 according to some embodiments. Server system 106 (herein after server 106) typically includes one or more processing units (CPUs) 902, one or more network or other communications interfaces 904, memory 906, and one or more communication buses 908 for interconnecting these components. The communication buses 908 may include circuitry (sometimes called a chipset) that interconnects and controls communications between system components. The server 106 optionally includes a user interface (not shown), for instance, a display and a keyboard. Memory 906 includes high-speed random access memory, such as DRAM, SRAM, DDR RAM or other random access solid state memory devices; and may also include non-volatile memory, such as one or more magnetic disk storage devices, optical disk storage devices, flash memory devices, or the like. Memory 906 may include mass storage that is remotely located from the CPUs 902. Memory 906, or one or more of the non-volatile memory devices in memory 906 comprise a computer readable storage medium that stores one or more programs for execution by one or more processors. In some embodiments, memory 906 or the computer readable storage medium of memory 906 stores the following programs, modules and data structures, or a subset or superset thereof:

an operating system 910 that includes procedures for handling various basic system services and for performing hardware dependent tasks;

a real time clock 150 that operates as a computer clock;

a network communication module 108 that is used for connecting the server 106 to other servers or computers (such as clients) via one or more communications interfaces and one or more communication networks 104 (wired or wireless), such as the Internet, other wide area networks, local area networks, metropolitan area networks, and so on;

an event association module 120 that receives event data 139 associated with events that occur at one or more clients, and processes the received event data from which personal identifiable information has been removed; in some embodiments the event data is processed by event association module 120 to identify correlations and patterns among the events that occur at the same clients, and to generate statistics and perform statistical analyses of the event data;

an event log 130 that is used to store received event data 139 associated with events that have occurred at one or more clients;

a DLL update module 143 that provides a DLL update (or DLL updates) to one or more requesting clients; and an event reconstruction module 110 that, based on event data 156 received from a client and/or server real time clock 112, reconstructs at least one of: a chronological order of the events on the client and the time when each event occurred at the client.

Each of the above identified elements of the server system 106 may be stored in one or more of the previously mentioned memory devices of memory 906, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 906 may store a subset of the modules and data structures identified above. Furthermore, memory 906 may store additional modules and data structures not described above.

Although FIG. 9 shows a server system, FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers. The actual number of servers used to implement a server system and how features are allocated among them will vary from one implementation to another, and may depend in part on the amount of data traffic that the system must handle during peak usage periods as well as during average usage periods.

Figure 10:
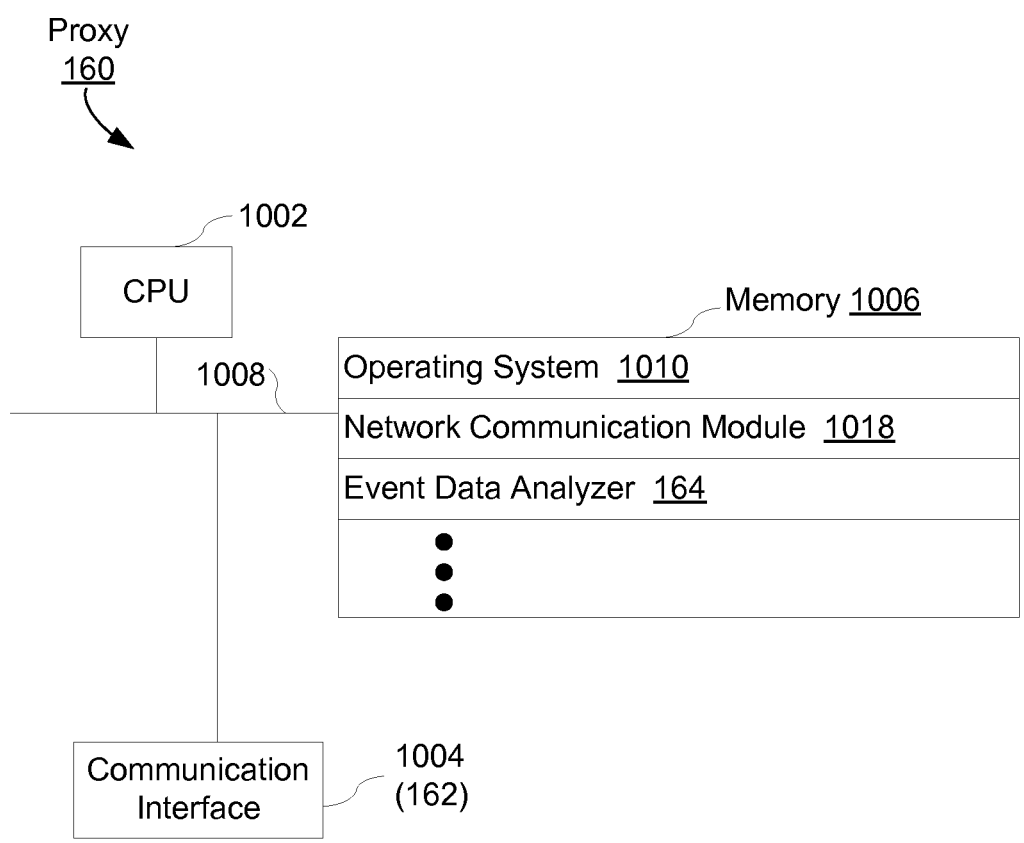
FIG. 10 is a block diagram of a proxy (also called a proxy system) according to some embodiments.

FIG. 10 is a block diagram of a proxy 160 (also called a proxy server, or proxy system) according to some embodiments. Proxy 160 typically includes one or more processing units (CPUs) 1002, one or more network or other communications interface 1004 (e.g., network interface 162, FIG. 1), memory 1006, and one or more communication buses 1008 for interconnecting these components. The communication buses 1008 may include circuitry (sometimes called a chipset) that interconnects and controls communications between system components. Memory 1006 includes high-speed random access memory, such as DRAM, SRAM, DDR RAM or other random access solid state memory devices; and may also include non-volatile memory, such as one or more magnetic disk storage devices, optical disk storage devices, flash memory devices, or the like. Memory 1006 may include mass storage that is remotely located from the CPUs 1002. Memory 1006, or one or more of the non-volatile memory devices in memory 1006 comprise a computer readable storage medium that stores one or more programs for execution by one or more processors. In some embodiments, memory 1006 or the computer readable storage medium of memory 1006 stores the following programs, modules and data structures, or a subset or superset thereof:

- an operating system 1010 that includes procedures for handling various basic system services and for performing hardware dependent tasks;
- a network communication module 1018 that is used for connecting the proxy 160 to other proxies, servers or computers (such as clients 102 and server 106) via one or more communications interfaces 1004 and one or more communication networks 104 (wired or wireless) such as the Internet, other wide area networks, local area networks, metropolitan area networks, and so on; and
- an event data analyzer (e.g., an application) 164 that removes personal identifiable information (PII) in (or sent along with) event data 139 or 156 received from a client; one embodiment of which is described above in detail with reference to operations 222 and 224 of FIG. 2A.

Each of the above identified elements of the proxy 160 may be stored in one or more of the previously mentioned memory devices of memory 1006, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1006 may store a subset of the modules and data structures identified above. Furthermore, memory 1006 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
    at a client,
        executing a first application to:
            identify event information with respect to events that occur at the client, including events associated with execution of one or more other applications resident on the client, wherein the first application is resident on a removable memory device that is electronically coupled with the client and the first application is executed from the removable memory device;
            install a browser loadable object in a browser application; and
            in accordance with a determination that event information is being blocked from being sent to a communications network, communicate with the browser application executing on the client using the browser loadable object to transmit the event information to the communications network, wherein the browser application and not the first application is in communication with the communications network.

2. The method of claim 1, wherein the browser loadable object registers callback information with the first application.

3. The method of claim 2, further comprising:
    executing the first application to use the callback information to communicate a network request to the browser loadable object.

4. The method of claim 3, wherein the browser loadable object receives the network request from the first application and sends the network request to the communications network.

5. The method of claim 1, wherein the event information is transmitted to the communications network upon a determination that the event information is being blocked from being sent to the communications network by a firewall at the client.

6. The method of claim 1, wherein remote procedure calls are used for communications between the first application and the browser application.

7. The method of claim 1, further comprising:
    transmitting the event information when a network connection is established between the client and a server and a respective trigger condition is met, the respective trigger condition selected from the set consisting of: passage of a predetermined amount of time after a previous transmission of event information, collection of a predetermined amount of event information at the client, and occurrence of a particular event or events at the client.

8. The method of claim 1, wherein the events for which event information is identified include one or more: HTTP requests originating at the client, and activation of the browser application on the client.

9. The method of claim 8, wherein an event for which event information is identified includes execution of the first application resident.

10. The method of claim 1, wherein the event information transmitted to the server includes a unique identifier associated with the first application.

11. The method of claim 1, wherein the first application silently executes on the first client without being visible to a user of the first client.

12. The method of claim 1, wherein the removable memory device has a secure partition and a non-secure partition, wherein the first application is stored on and executed by the client from a secure partition of the removable memory device.

13. The method of claim 1, wherein the removable memory device has a secure partition and a non-secure partition, the method further comprising storing the identified event information at least temporarily on the non-secure partition of the removable memory device before transmission of the identified event information to a server via the communications network.

* * * * *